United States Patent
Corvo

(10) Patent No.: US 9,317,193 B2
(45) Date of Patent: Apr. 19, 2016

(54) GRAPHICAL USER INTERFACE

(75) Inventor: Maurizio Corvo, Uster (CH)

(73) Assignee: FERAG AG, Hinwil (CH)

( * ) Notice: Subject to any disclaimer, the term of this patent is extended or adjusted under 35 U.S.C. 154(b) by 373 days.

(21) Appl. No.: 13/821,230

(22) PCT Filed: Sep. 13, 2011

(86) PCT No.: PCT/CH2011/000215
§ 371 (c)(1),
(2), (4) Date: May 10, 2013

(87) PCT Pub. No.: WO2012/034245
PCT Pub. Date: Mar. 22, 2012

(65) Prior Publication Data
US 2013/0227473 A1    Aug. 29, 2013

(51) Int. Cl.
*G06F 13/00* (2006.01)
*G06F 15/00* (2006.01)
*G06F 3/0484* (2013.01)
*G05B 19/409* (2006.01)
*G06F 3/0481* (2013.01)

(52) U.S. Cl.
CPC .......... *G06F 3/04845* (2013.01); *G05B 19/409* (2013.01); *G06F 3/04817* (2013.01)

(58) Field of Classification Search
CPC .......................... G06F 3/04845; G06F 3/04817
USPC ......... 715/769, 770, 708, 763–765, 779, 737, 715/735
See application file for complete search history.

(56) References Cited

U.S. PATENT DOCUMENTS

| | | |
|---|---|---|
| 5,548,702 A | 8/1996 | Li et al. |
| 5,638,505 A | 6/1997 | Hemenway et al. |
| 5,754,179 A | 5/1998 | Hocker et al. |
| 5,764,873 A | 6/1998 | Magid et al. |
| 5,870,091 A | 2/1999 | Lazarony, Jr. et al. |
| 6,411,310 B1 | 6/2002 | Berquist et al. |
| 6,535,230 B1 | 3/2003 | Celik |
| 2002/0196271 A1 | 12/2002 | Windl et al. |
| 2003/0076362 A1 | 4/2003 | Terada |
| 2003/0179243 A1 | 9/2003 | Numano |
| 2005/0125742 A1 | 6/2005 | Grotjohn et al. |

(Continued)

FOREIGN PATENT DOCUMENTS

| | | |
|---|---|---|
| EP | 0 747 804 A1 | 12/1996 |
| JP | 07-200236 A2 | 8/1995 |

(Continued)

OTHER PUBLICATIONS

Klauser et al. Linux X User Guide Ch.9 KDE. pp. 1-32.

(Continued)

*Primary Examiner* — Kevin Nguyen
(74) *Attorney, Agent, or Firm* — Knobbe, Martens, Olson & Bear, LLP

(57) ABSTRACT

The invention relates to a computer-implemented graphical user interface (6) comprising a work area and multiple widgets (W13, W13*a*, W13*b*, W13*c*) that are arranged on the work area such that said widgets are visible to the user. Each output widget (W13) comprises one or more content windows (Fl3) with data elements. The widgets (W13, W13*a*, W13*b*, W13*c*) and the content windows (Fl3) are coupled such that a content window (Fl3) and/or data elements that are selected in said window can be moved by the user from an output widget (Wl3) in which said content window and/or data elements are arranged into one of multiple possible target widgets (W13*a*, W13*b*, W13*c*) that are visible to the user for processing.

14 Claims, 15 Drawing Sheets

(56) References Cited

U.S. PATENT DOCUMENTS

| | | |
|---|---|---|
| 2006/0070007 A1 | 3/2006 | Cummins et al. |
| 2007/0226642 A1 | 9/2007 | Soulier |
| 2008/0034317 A1 | 2/2008 | Fard et al. |
| 2008/0141153 A1 | 6/2008 | Samson et al. |
| 2008/0155439 A1 | 6/2008 | Stern et al. |
| 2009/0319939 A1 | 12/2009 | Danton et al. |
| 2014/0032722 A1* | 1/2014 | Snow .......................... 709/220 |

FOREIGN PATENT DOCUMENTS

| | | |
|---|---|---|
| JP | 10-240488 A2 | 9/1998 |
| JP | 2003-290630 A2 | 10/2003 |
| JP | 2008-009831 A2 | 1/2008 |
| JP | 2010-152797 A2 | 7/2010 |
| WO | WO 02/067101 A2 | 8/2002 |

OTHER PUBLICATIONS

European Office Action dated Sep. 15, 2014 regarding EP Application 11 761 473.5.

Doerflinger, et al., "The KPager Handbook", Aug. 30, 2008, (XP002662293); http://wayback.archive.org/web/*/http://docs.kde.org/development/en/extragear-utils/kpager/kpager.pdf.

Office Action issued in Japanese Patent Application No. 2013-528486, mailed on Jun. 2, 2015.

* cited by examiner

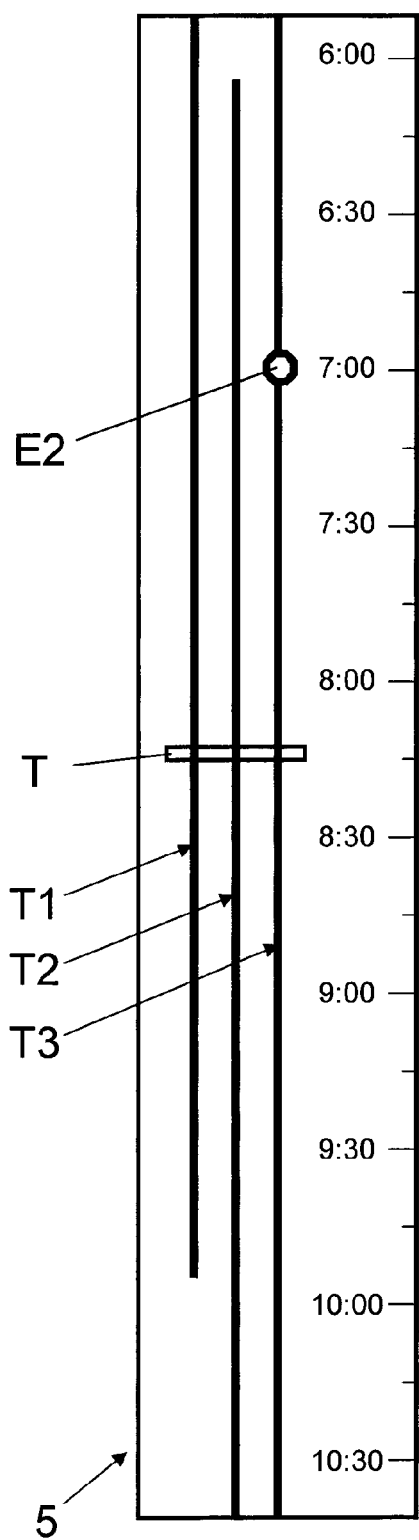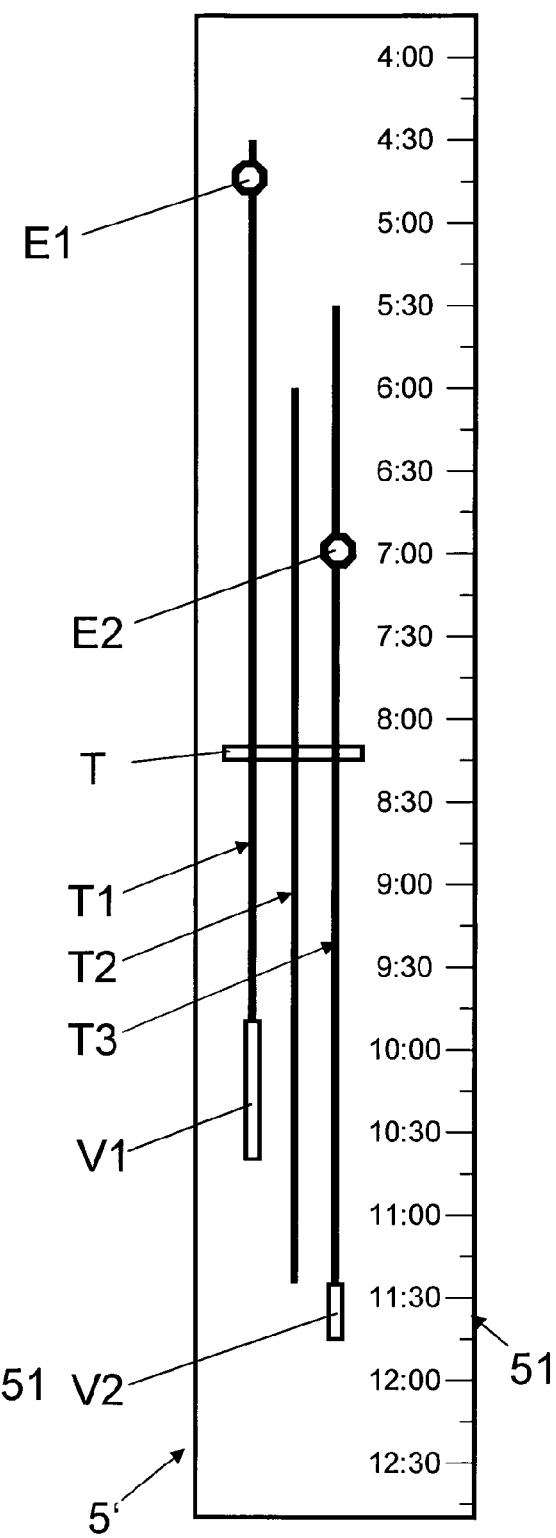
Fig. 17a  Fig. 17b

GRAPHICAL USER INTERFACE

This application is the U.S. National Phase under 35 U.S.C. §371 of International Application No. PCT/CH2011/000215, filed Sep. 13, 2011.

TECHNICAL FIELD

The present invention relates to a computer-implemented graphical user interface. The present invention relates especially to a computer-implemented graphical user interface having a desktop and several widgets arranged thereon, and to a method and devices for generating the graphical user interface on a display, especially on a touch-sensitive display.

PRIOR ART

Graphical user interfaces have continuously improved in recent decades, in parallel with the development of more cost-effective and higher-resolution displays and their application has spread on the basis of the information technology and information processing field in almost all areas of the technology, especially also in telecommunications, in entertainment electronics and in industrial production and processing plants. In industry, graphical operating interfaces which are represented on a touch-sensitive display, i.e. on a touch-sensitive screen or "touch screen" for the reproduction (output) and input of data and instructions, are increasingly used for the operation of machines. This is happening not least because such touch-sensitive displays provide for a more flexible and more cost-effective adaptation than, for example, man-machine-interfaces with electromechanical operating elements such as conventional buttons, keyboards or moving computer mice.

The subject matter of WO07025396A is a graphical user interface which consists both of a touch screen and of mechanical buttons and rotary switches. A method and a device for controlling sequences of one or more machines by means of an operating unit, designed as man-machine interface, is disclosed. The sequences and parameters are programmed by, and also operatively changed, in a manner supported on screen by means of input points by the user at the operating interface of the operating unit. The operating interface is divided into two operating panels. The first operating panel has a relatively large screen and, apart from displaying operating states, tables, lists etc., is mainly used also for sequence programming. The second operating panel is used as a central function for operative interventions. Both operating panels are designed for a data exchange in both directions.

DE112005001152 describes a method for retrieving and displaying technical data for an industrial facility. The subject matter of DE112005001152 is a method for transferring a user interface on a mobile computer having relatively small display and input devices to a larger terminal which is connected to an industrial facility. If a user who operates, e.g., a portable PDA (Personal Digital Assistant) approaches the large screen of the industrial facility, a wireless facility integrated in the PDA is detected by a wireless facility in the vicinity of the large screen and a connection is set up. The user can then mark and select the corresponding terminal. The large screen indicates, e.g., a copy of the same display as on the PDA of the user. By providing several entities of a graphical user interface, parameters of a special machine can be rapidly retrieved and manipulated in this manner.

The subject matter of EP1156437A2 is a system and method for monitoring a print production workflow. The system comprises workflow management software which monitors and facilitates the method steps of the workflow, namely the beginning of an order, the input of an order, the processing of an order, the print production and the completion of an order. The workflow management software comprises an integrated object-oriented interface which visually displays the workflow and by means of which it is possible to intervene in the workflow. In addition, the software offers the functionality of creating, processing and changing composite documents as ordered collections of documents. The workflow management software provides, e.g., for elimination, copying, insertion, displacement actions on one page or on several pages of a document. This functionality is preferably achieved by means of pull-down menus, inserted dialog windows, option bars or symbols. In addition, the results of the actions are indicated in a visual display of the document on the display of the processing station. Display windows are used for the intuitive visual representation of the work which has to be performed at a processing station.

In DE102008001665A, methods for generating uniform user interfaces for controlling textile machines are described. Apart from basic application programs, additional application programs having additional functionalities are frequently implemented which are generally created by different programmers and have user interfaces according to different operating philosophies comprising different appearances. This leads to a higher training effort for the operators and to an increased risk of operating errors. In addition, the time expended for operating during the use of the textile machine is increased. To avoid this, the use of an independent graphical program module in which display elements or display routines are stored is proposed in DE102008001665A. An additional application program can thus be developed largely independently of the basic application program and the operator is automatically presented with a uniform appearance with a uniform operating philosophy both in the basic application area and in the additional application area. DE102008001665A thus supports a manufacturer of textile machine controls in the development of user interfaces which are uniform for basic applications and their additional functions.

The operation of machines in industry, especially machines in the printing and printing product finishing industry requires user interfaces with regard to configuration, control, monitoring, maintenance and editing and displaying commercial and operational information for the most varied business areas, machine types, functions, users and user authorizations, both at the level of control involving a number of machines connected to one another and at the level of individual machines or at the station level involving parts of individual machines. Generally, proprietary user interfaces of the manufacturers of the machines are used which leads overall to nonuniform operating interfaces when machines and/or stations of different manufacturers and/or machine generations are used in combination. With regard to efficient training, utilization, development and adaptation, however, as uniform as possible graphical operating interfaces are desirable, however, which are not available at present in the prior art.

Furthermore, there is the requirement that the operating terminals for the graphical operating interfaces can be arranged or attached cost-effectively and on or at the respective machines or machine components in the industrial environment. In this context, dimensional restrictions often exist since various logistical, safety-related or operative boundary conditions must be met in the industrial environment. Such boundary conditions regularly lead to the operating interfaces being limited to small displays with screen sizes from 5 to 15 inches especially in the production area. On the other hand, higher-level planning, configuration, monitoring and control functions of an entire production or processing plant and occasionally also special machines or stations of the plant require user interfaces having much larger dimensions.

Thus, partially contradictory and mutually colliding requirements exist for graphical user interfaces, especially for the operation of industrial production and processing plants. On the one hand, operating terminals having differently sized displays and differently dimensioned operating interfaces are used for the operation of the same plant but on the other hand, the user interfaces should be usable in a uniform and simple manner.

DESCRIPTION OF THE INVENTION

It is an object of the present invention to provide a computer-implemented graphical user interface and a method and devices for generating the graphical user interface on a display, which user interface does not have at least some disadvantages of the prior art and which, in particular, enables a user to manipulate data in a simple and efficient manner.

The object is achieved by the features of the independent claims. Further advantageous embodiments are also found in the dependent claims and the description.

The above-mentioned aims are achieved by the present invention, especially due to the fact that a computer-implemented graphical user interface comprises a desktop and several widgets arranged to be visible to the user on the desktop, wherein source widgets in each case comprise one or more content windows having data elements and wherein the widgets and the content windows are coupled in such a manner that a content window selected by the user and/or data elements selected therein can be moved by the user from a source widget, in which they are arranged, into one of several possible target widgets visible to the user when the content window (F13) and/or the data element (D) is selected, for the purpose of processing.

In one variant of the embodiment, the widgets and the content windows are coupled in such a manner that a content window and/or data elements selected therein can be pulled out of the relevant source widget by the user without placement on the desktop, wherein the possible target widgets by which the relevant content window or the selected data elements, respectively, can be processed, are indicated to the user.

In a further variant of the embodiment, one of the target widgets is configured for creating a copy of a content window or of selected data elements, respectively, which are positioned in the target widget and arranging itself with the copy of the content window or of the selected data elements, respectively, on the desktop.

In a further variant of the embodiment, the widgets and the content windows are coupled in such a manner that the target widgets are indicated stacked behind one another in the manner of roof tiles, wherein alternately in each case one of the target widgets is indicated foremost in the stack until the relevant content window or the selected data elements, respectively, are placed in the target widget currently indicated foremost, or again in the source widget.

In one variant of the embodiment, the user interface comprises an information area for representing a section of the desktop and a much smaller navigation area in comparison with the information area, arranged outside the information area, with a miniaturized representation of the entire desktop and the widgets arranged thereon, wherein the navigation area and the information area are coupled in such a manner that a miniaturized representation of the target widget, into which the relevant content window or the selected data elements, respectively, have been placed, is marked for the user in the navigation area.

In one variant of the embodiment, the widgets in each case comprise one or more content windows and the widgets and the content windows are coupled in such a manner that a content window can be moved completely out of the relevant widget onto the desktop by the user, wherein the content window moved out of the widget in each case creates a new widget and the content window is arranged in the newly created widget.

In a further variant of the embodiment, the widgets and/or content windows can be reduced in each case to a header bar by the user, wherein the header bar comprises a status indicator for indicating a current status value allocated to the relevant widget or content window, respectively.

In a further variant of the embodiment, the widgets in each case comprise one or more visible indicators of other target widgets linked with the relevant widget, and the widgets and the content windows are coupled in such a manner that a content window and/or data elements selected therein can be moved out of the source widget by the user via one of the indicators, wherein possible processing actions of the relevant target widget are shown to the user on which the content window or the selected data elements, respectively, can be deposited for corresponding processing.

In one variant of the embodiment, the widgets and the visible indicators are coupled in such a manner that in the case of a movement of the content window or of the selected data elements, respectively, over one of the indicators, the target widget allocated to the indicator is indicated next to the source widget and the possible processing actions are shown graphically in the relevant target widget.

In a further variant of the embodiment, the user interface comprises a two-dimensional holding matrix which can be indicated for representing the possible processing actions of the relevant target widget, and provides for a deposition of the content window or of the selected data elements, respectively, in a matrix cell for processing of the content window or the selected data elements, respectively, by a processing action determined by the relevant matrix cell.

In a further variant of the embodiment, the widgets are coupled in such a manner that several widgets can be tied to one another by stringing together on the desktop by the user in such a manner that they can be moved as a unit on the desktop until they are separated again from one another by the user.

In one variant of the embodiment, the user interface comprises a widget inventory with a representation of available, but currently exclusively inactive widgets not arranged on the desktop, wherein the desktop and the widget inventory are coupled in such a manner that an active widget can be moved from the desktop into the widget inventory by the user and during this process becomes inactive, and that an inactive widget can be moved from the widget inventory onto the desktop by the user and during this process becomes active.

In addition to the computerized user interface, the present invention also relates to a computer-implemented method and a computerized device having an interface module for generating a graphical user interface on a display, in particular on a touch-sensitive display of a terminal. The present invention also refers to a computer program product, in particular a computer-readable medium with computer code stored thereon, for controlling a processor in such a manner that the processor generates the graphical user interface on a display, especially on a touch-sensitive display.

In a further aspect of the present invention, a computer-implemented graphical user interface for a display comprises an information area for representing a section of a desktop and a much smaller navigation area in comparison with the information area, arranged outside the information area, one or several widgets being arranged on the desktop and the navigation area having a miniaturized representation of the entire desktop and of the widgets arranged thereon and wherein the navigation area and the information area are coupled via a selection indicator movable in the navigation area, in such a manner that a part area determined by the selection indicator in the navigation area, of the desktop represented miniaturized, corresponds to the section of the desktop represented in the information area.

The widgets shown miniaturized in the navigation area can preferably be moved on the miniaturized desktop by the user and the navigation area and the information area are coupled in such a manner that positioning a miniaturized widget on the miniaturized desktop of the navigation area causes a corresponding positioning of the relevant widget on the desktop.

In one variant of the embodiment, the widgets can be moved by the user from the information area to the desktop, shown miniaturized, in the navigation area, the moved widgets in each case being shown miniaturized in the navigation area and the navigation area and the information area are coupled in such a way that the positioning of the miniaturized widgets on the miniaturized desktop of the navigation area in each case produces corresponding positioning of the relevant widgets on the desktop.

In a further variant of the embodiment, the widgets on the desktop are coupled in such a way that in the case of an overlap of a user-positioned widget with another widget on the desktop and/or in the case of an overlap of a user-positioned miniaturized widget with another miniaturized widget arranged on the miniaturized desktop a non-overlapping arrangement of the widgets or the miniaturized widgets, respectively, is generated, the navigation area and the information area being coupled in such a way that the non-overlapping arrangement of the widgets produces a corresponding arrangement of the miniaturized widgets on the miniaturized desktop or, respectively, the non-overlapping arrangement of the miniaturized widgets produces a corresponding arrangement of the widgets on the desktop.

In one variant of the embodiment, the navigation area comprises several navigation part-areas separated from one another which in each case have a miniaturized representation of one of several adjoining parts of the desktop and the widgets arranged thereupon. The widgets can be moved from one of the navigation part-areas into another one of the navigation part-areas by the user, the navigation part-areas and the information area being coupled in such a manner that a positioning of a miniaturized widget on the miniaturized representation of the relevant part of the desktop produces a corresponding positioning of the corresponding widget on the desktop.

In a further variant of the embodiment, the widgets and the navigation part-areas are coupled in such a manner that in the case of a movement of a widget by the user from one of the navigation part-areas into another one of the navigation part-areas, the permissibility of the positioning of the widget in the other one of the navigation part-areas, for example according to stored rules, is checked and the movement of the widget is rejected if the permissibility of the positioning is not given.

In one variant of the embodiment, the selection indicator can be moved over the navigation part-areas, the selection indicator, during a positioning over a boundary area between two navigation part-areas in the information area, producing a representation of the corresponding two adjoining parts and the widgets arranged thereon of the desktop.

In one variant of the embodiment, a copying mode can be set by the user and the navigation area and the widgets are coupled in such a manner that in the copying mode a copy of the relevant widget is created and arranged on the desktop when a miniaturized widget is moved from the navigation area into the information area.

In a further variant of the embodiment, the widgets in the information area can be changed by the user in their dimensioning and the navigation area and the information area are coupled in such a manner that a change in the dimensioning of a widget in the information area in each case produces a corresponding change of the corresponding miniaturized widget in the navigation area.

In one variant of the embodiment, the widgets are coupled with an interface module which is configured for storing user-defined changes and/or positionings of widgets in a user profile and in the case of a log-in of the user, to position and correspondingly represent the widgets in the information area or in the navigation area, on the desktop in accordance with the user profile.

In a further variant of the embodiment, the navigation area and the widgets are coupled in such a way that during a positioning of a miniaturized widget in the navigation area, the miniaturized representation of the widgets is scaled in the case of a lack of space in order to ensure a non-overlapping representation of all miniaturized widgets within the navigation area.

In one variant of the embodiment, the user interface comprises rapid-access elements which, each time they are actuated by the user, have the effect that a widget allocated to the relevant rapid-access element by the user is displayed in the information area and that the selection indicator indicates the corresponding part area of the desktop, shown miniaturized, with the relevant miniaturized widget arranged thereupon, in the navigation area.

In a further aspect of the present invention, a graphical configuration interface which comprises a miniaturized representation of a desktop for the graphical user interface is shown for configuring a graphical user interface for displays of various terminals, configuration instructions are received for selecting widgets and for arranging the widgets in the desktop by positioning miniaturized representations of the widgets in the desktop shown miniaturized, configuration instructions are received for selectively allocating to the terminals in each case one or several defined parts of the desktop, and the graphical user interface is defined for in each case one of the terminals on the basis of the allocated parts of the desktop and the widgets arranged therein.

The graphical user interface is preferably generated with an information area for representing a section of the parts of the desktop, arranged adjoining one another and in each case assigned to the relevant terminal, and with a much smaller navigation area in comparison with the information area, arranged outside the information area, the navigation area in each case comprising a miniaturized representation of the desktop with all parts assigned to the relevant terminal and the widgets arranged thereupon, and the navigation area and the information area being coupled, via a selection indicator which can be moved in the navigation area, in such a manner that a selection area, determined by the selection indicator in the navigation area, of the desktop shown miniaturized corresponds to the section of the desktop shown in the information area.

In one variant of the embodiment, the navigation area generated with several navigation part-areas separated from one another which in each case have a miniaturized representation of one of the parts of the desktop assigned to the relevant terminal and the widgets arranged thereupon, the navigation part-areas being generated in such a manner that widgets shown miniaturized can be moved from one of the navigation part-areas into another one of the navigation part-areas by the user and that the navigation part-areas and the information area are coupled in such a way that positioning of a miniaturized widget on the miniaturized representation of one of the parts of the desktop produces a corresponding positioning of the relevant widget on the relevant part of the desktop in the terminals to which the relevant part is allocated.

In a further variant of the embodiment, the navigation part-areas are coupled in such a manner that in the case of a movement of a widget by the user from one of the navigation part-areas into another one of the navigation part-areas, the permissibility of the positioning of the widget in the other one of the navigation part-areas is checked, for example in accordance with stored rules, and the movement of the widget is rejected if the permissibility of the positioning is not given.

In one variant of the embodiment, a first navigation part-area is provided as preparation area for defining a production configuration of a printing production system or printing product processing system, a second navigation part-area is provided as production area for monitoring and controlling a production or processing of printed products in the printing production system or printed product processing system, respectively, and a third navigation part-area is provided as distribution area for defining the delivery of the printed products of the printing production system or printed product processing system, respectively. In one variant, a fourth navigation part-area is provided as evaluation area for statistical functions and reporting functions.

In a further variant of the embodiment, configuration instructions are received for defining the parts of the desktop and one part can be defined as coupled or decoupled in each case for the terminals, a part of the desktop defined as coupled being generated in such a manner that it replicates changes in the relevant part in the other terminals to which the relevant part is allocated, and a part defined as decoupled being generated in such a manner that it does not replicate changes in the relevant part in the other terminals.

In one variant of the embodiment, the user interface is generated with a copying function, the copying function being configured for creating, in a copying mode set by the user, a copy of the widget when a miniaturized widget is moved from the navigation area into the information area, and arranging the copy on a part of the desktop in those terminals to which the relevant part is allocated.

In a further variant of the embodiment, configuration instructions for assigning rapid-access elements to the terminals are received. The user interface is generated in each case with assigned rapid-access elements for a terminal, which elements, when actuated by the user, have the effect that a defined area of the desktop allocated to the relevant rapid-access element and of the widgets arranged thereupon is displayed in the information area and the selection indicator indicates the corresponding selection area of the desktop, shown miniaturized, and the corresponding miniaturized widgets arranged thereupon, in the navigation area.

In one variant of the embodiment, the graphical user interface is generated with a log-in area, the log-in area, the information area and the navigation area being coupled in such a manner that the widgets are arranged user-specifically in accordance with stored user adjustments, group-specifically in accordance with stored group adjustments and generically in accordance with stored basic adjustments on the desktop and are shown in the information area and navigation area.

In a further variant of the embodiment, the graphical user interface for a terminal is in each case generated with a widget inventory, the widget inventory comprising a representation of available but currently exclusively inactive widgets not arranged on the parts of the desktop allocated to the relevant terminal and the desktop and the widget inventory being coupled in such a way that an active widget can be moved from the parts of the desktop allocated to the relevant terminal into the widget inventory by the user and during this process becomes inactive, and that an inactive widget can be moved from the widget inventory to a part of the desktop allocated to the relevant terminal by the user and during this process becomes active.

BRIEF DESCRIPTION OF THE DRAWINGS

In the text which follows, an embodiment of the present invention is described with reference to an example. The example of the embodiment is illustrated by the following attached figures:

FIGS. 17a, 17b: illustrates scalable time bars with production orders indicated therein and their respective production sequences.

APPROACHES FOR CARRYING OUT THE INVENTION

Figure 1:
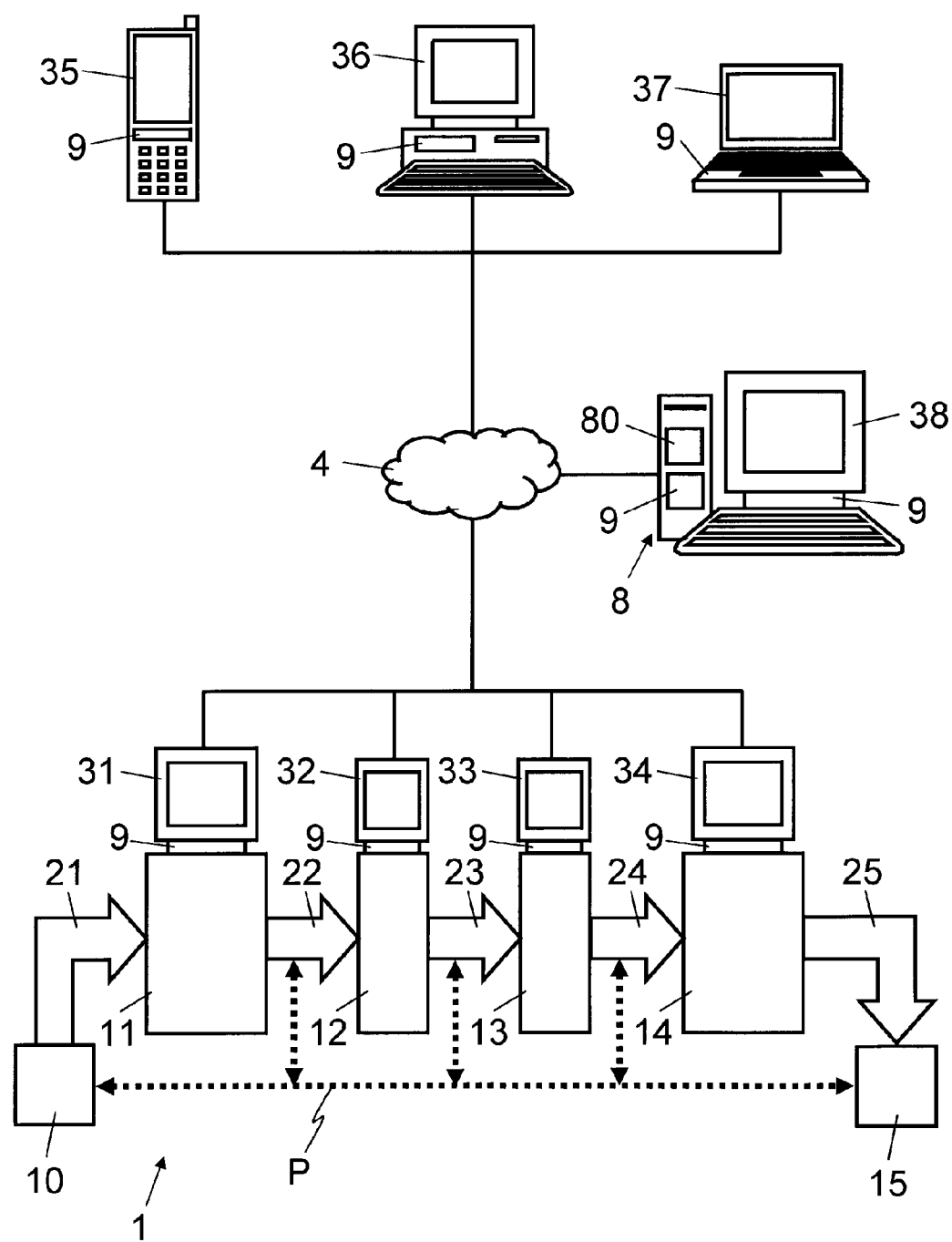
FIG. 1: shows a block diagram of a production plant having a number of machines of a production line, a higher-level line master and several terminals with displays for operating the production plant.

In FIG. 1, reference symbol 1 refers to a production plant in the graphical printing production field, in the industry for processing printed products and/or in the area of logistics and transport. The production plant 1 shown diagrammatically in FIG. 1 comprises several machines 10, 11, 12, 13, 14, 15 of one (or several) production line(s) which are connected to one another via conveyors 21, 22, 23, 24, 25. The production plant 1 comprises especially machines and conveyors, e.g. with conveyor chains and/or conveyor belts, for printing production systems (such as so-called rotations) and printed product processing systems comprising printing machines, collecting systems for collecting (in the wider sense) or collecting production collections from several products by assembling, inserting or collecting (in the narrower sense), processing plants for inserting, wrapping, stapling, bonding, cutting, welding, addressing and/or stacking including feeders, parcel hoists, rod feeders, winding stations and hooping machines and newspaper dispatch systems, digital on-demand book production system and distribution and dispatch systems (mail room). The production plant 1 also comprises machine units which fulfill additional functions (add-ons) such as, for example, attaching adhesive labels (e.g. Memostick®) or printing in the flow of processing, and which are here also called machines. The products are especially flat, flexible printed products of different thicknesses but also other flat products such as, for example, data media or other enclosures. The expert will understand that the production plant 1 is shown in a greatly simplified way and, in practice, comprises not only a sequential arrangement of machines 10-15 and connecting conveyors 21-25 but that the production plant 1 comprises a flexibly configurable conveyor system and the machines 10-15 and conveyors 21-25 can be combined and configured for the most varied production cases via differently configurable conveyor paths as indicated in FIG. 1 by the dotted arrows P.

For controlling the production line(s), the production plant 1 comprises a computerized line master 8 which comprises one or more operable computers having in each case one or more processors, for example a server, and is connected to an associated terminal 38 which comprises a display. The line master 8 is connected via a communication system 4 to a number of further terminals 31, 32, 33, 34, 35, 36, 37 which have in each case a display.

The displays of the terminals 31-38 are preferably touch-sensitive displays (touch screens) for representing graphical user interfaces and the production (output) and input of data and instructions. Particularly preferably, so-called multi-touch screens are used which provide for manipulation using several fingers at the same time. The touch-sensitive systems used are, e.g., inductive, capacitive or pressure-related sensor techniques which, in particular, also take into account industrial situations. Touch-sensitive multi-touch screens enable a user not only to input data and instructions but also to manipulate the user interface by means of his fingers, for example displacing and changing the size and dimensioning of objects or turning pages and scrolling in the user interface and configuring the user interface.

As is shown diagrammatically in FIG. 1, the individual terminals 31-34 are in each case arranged directly at a machine 11-14 and connected to it or designed as terminals 35-38 independent of the machines 10-15, for example freely movable. The terminals 31-38 comprise one or more processors and are designed, for example, as data input and data output terminal, personal computers (PCs), industrial PC modules, mobile PCs, PDAs (personal digital assistants) or mobile telephones (smart phones). For controlling the production line(s), the line master 8 is connected, depending on embodiment variant and/or configuration, via the communication system 4 directly to the machines 10-15 and conveyors 21, 22, 23, 24, 25, or indirectly via a terminal 31-34 which is connected to a machine 11-14. Correspondingly, control, configuration and inquiry data and commands are exchanged between the line master 8 and the machines 10-15 and conveyors 21-25 of the production line(s) directly via the communication system 4 or via the communication system 4 and the terminals 31-34. Similarly, user instructions and data which are input by users via the terminals 31-38 for controlling, configuring or polling the machines 10-15 and conveyors 21-25 are in each case conveyed by the relevant terminal 31-34 directly to the machine 11-connected to it, directly conveyed via the communication system 4 to a remotely arranged machine 10-15 or a conveyor 21-25, respectively, or conducted indirectly to the relevant machine 10-15 or the relevant conveyor 21-25, respectively, via the line master 8.

Depending on embodiment, the communication system 4 comprises conductor-less (wireless) and/or conductor-connected (e.g. wired) communication links or communication networks, respectively, for example local area networks (LAN, WLAN), system buses and/or individual direct lines.

The production plant 1 is preferably configured in such a manner that the line master 8 comprises a data memory with the current control and configuration parameters and status values of the machines 10-15 and conveyors 21-25 of the production line(s) and can also receive and store data with production, distribution and route plan for the production line(s). The line master 8 comprises especially a data memory with configuration data for defined basic settings, group settings and user settings of the graphical user interfaces which are represented on the various displays of the terminals 31-38 for operating the production plant 1 as will be described in greater detail in the text which follows.

In this context, it should be noted here that the expression "operation of the production plant" also includes the most varied activities for the configuration, control, monitoring, maintenance, higher-level production planning of one machine in each case, a machine part (station), a plant section and/or a plant having a number of machines of the production line(s) and also the inquiry, editing, representation and outputting of operational, technical and economic information relating to the production line(s).

Depending on the variant of the embodiment and configuration, the user interfaces for operating and controlling the production plant 1 are embedded in a programmed production plant control system or in one or more programmed production plant control applications which are executed centralized on the line master 8 or distributed on the line master 8 and the terminals 31-38. Correspondingly, the production plant 1 comprises one or more interface modules 9 for generating, displaying and controlling the user interfaces which, for example, are configured for a traditional client/server architecture or a thin-client architecture and are arranged and executed in the line master 8 and/or in the terminals 31-38.

As is shown diagrammatically in FIG. 1, the line master 8 comprises a configuration module 80 for configuring the user interfaces for the terminals 31-38 of the production plant 1, especially in dependence on the differently dimensioned specific displays of the terminals 31-38 and/or the machine(s) 10-15 or conveyors 21-25, respectively, to be operated which are connected thereto. The configuration module 80 is preferably designed as a programmed software module which comprises computer program code for controlling one or more processors of the line master 8. The computer program code is stored on a computer-readable medium connected permanently or removably to the line master. The expert will understand that the configuration module 80 can be executed completely or partially by means of hardware components in alternative embodiments and/or can be arranged and executed on one or more other terminals 31-38.

Figure 3:
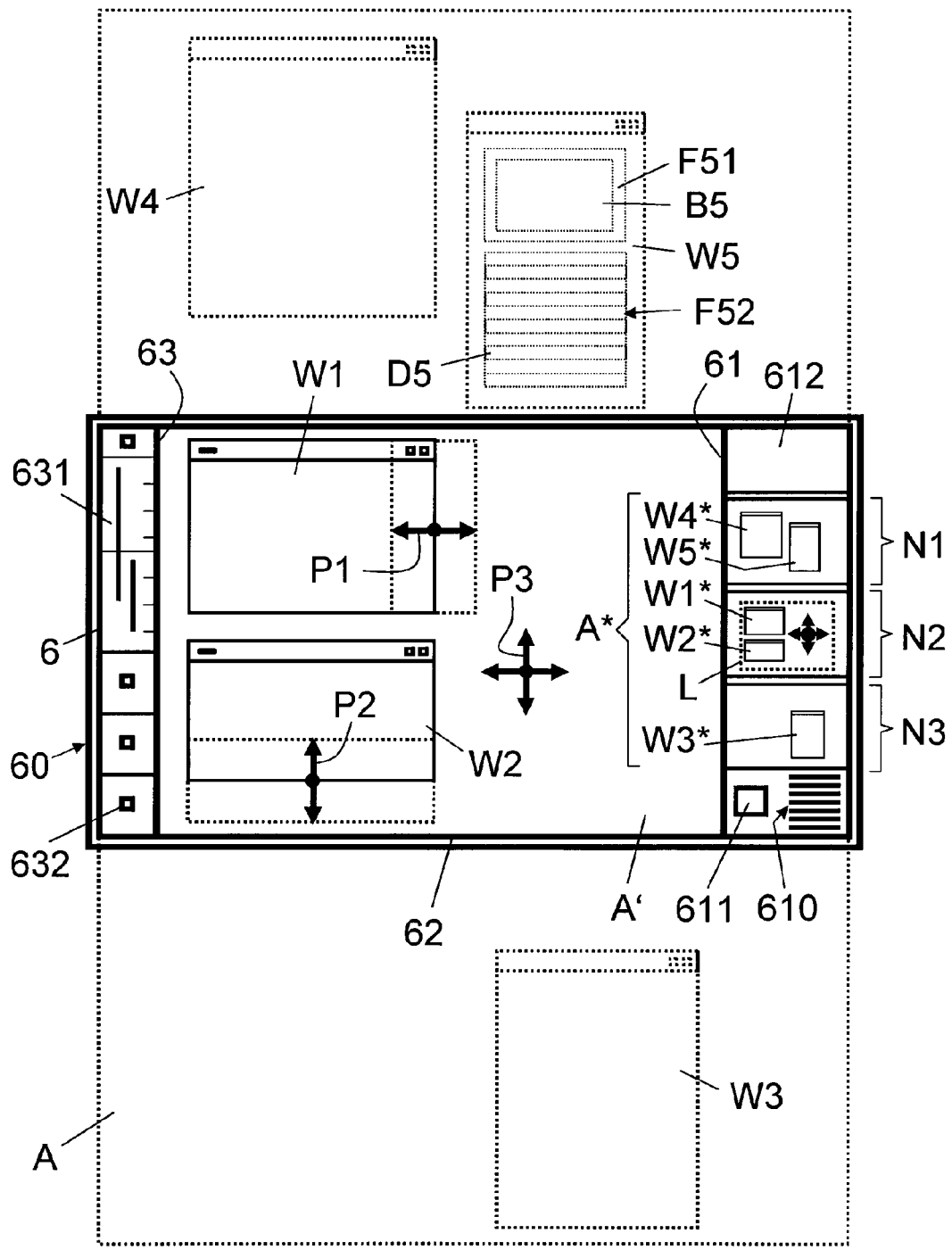
FIG. 3: shows a display with a graphical user interface which has a navigation area for the miniaturized representation of a desktop and widgets arranged thereupon, and an information area for representing a selected section of the desktop and of the widgets arranged therein.

FIG. 3 shows an example of a display 60 of one of the terminals 31-38 having a graphical user interface 6 for operating the production plant 1 or at least one machine 10-15, one conveyor 21-25 or other part of the production plant 1. As is shown diagrammatically in FIG. 3, the user interface 6 has a navigation area 61, an information area 62 and a control bar 63. In the example shown, the navigation area 61 and the control bar 63 are in each case vertically aligned but in alternative embodiments or configurations, they can also be vertically aligned.

The control bar 63 comprises a scalable timing bar 631 and rapid-access elements 632 which will be described in greater detail later.

The information area 62 shows the user a selected section A' of a desktop A. The desktop A is a virtual two-dimensional area comparable to the desktop in window-oriented user interfaces such as, for example, Microsoft Windows, Apple Mac OS or Apple iPhone OS. The desktop A has a size (width/height) which exceeds that of display 60 and can, therefore, not be displayed completely on the display 60 with a given full image resolution.

As can be seen in FIG. 3, several widgets W1, W2, W3, W4, W5, the size of which can be changed by the user in height, width and/or diagonal via the user interface 6, for example by corresponding finger manipulations on the touch-sensitive display 60 as is indicated diagrammatically by the dual arrows P1, P2, are arranged on the desktop A. The widgets W1-W5 are components of a graphical window system which consist in each case of a visible area (window) which receives user-generated events and represents data, and of a non-visible object which stores the state of the components and can change the visible area via certain operations. The widgets W1-W5 are linked into the window system of the production plant control system or the production plant control applications, respectively, and utilize it for interaction with the user or other widgets of the window system or of the production plant control system or the production plant control applications, respectively. An active widget W1-W5 is arranged on the desktop A and is executed in the production plant control system or in the production plant control applications, respectively, that is to say it is in an "executing" state and runs on one or several processors.

As is shown diagrammatically in FIG. 3, the widgets W5 comprise in each case one or several content windows F51, F52. The content windows F51, F52 are used for representing and/or manipulating data and can also additionally comprise input elements for inputting data values and/or instructions. The data shown in the content windows F51, F52 comprise data elements D5, for example with data values of production and plant parameters, production and plant-specific status values and concrete product data such as product designations or product size and/or other displayable data objects such as graphics or images 85, for example product images of newspaper title pages, cover pages or enclosures in the printed product processing. In a concrete example, a content window F51 comprises a specifically aligned image B5 from the title page of a concrete newspaper to be processed, and data elements with production-specific and plant-specific status values with regard to the completeness of the data records needed for the production, e.g. data records for the publisher of the newspaper, with regard to the loading of feed conveyors with the preproducts needed for the production (main products and enclosures) and with regard to the present definition of a production case defined and selectable for the production plant 1 which determines the configuration and interconnection of the machines 10-15 and/or conveyors 21-25 of the production plant 1. A further content window F52 comprises, for example, several data elements D5 in each case with the designation of a preproduct, e.g. various newspaper parts and advertising inserts, and an associated edition number.

The navigation area 61 shows the user a miniaturized representation of the entire desktop A and the widgets W1-W5 arranged thereon. The navigation area 61 with the desktop A* shown miniaturized and the widgets W1*, W2*, W3*, W4*, W5* shown miniaturized is coupled with the information area 62 via a selection indicator L which shows the user in the navigation area 61 the section A' of the desktop A represented in the information area 62. The selection indicator L is used by the user like a magnifying glass and can be moved in the navigation area 61 in the miniaturized desktop A* so that the user can select an arbitrary section A' of the desktop A for full-resolution representation in the information area 62. As is indicated with the crossed arrows in the selection indicator, the selection indicator L can be moved both in the horizontal and in the vertical direction and can be positioned by the user for section selection. Depending on the variant of the embodiment, the dimensioning (height, width) of the selection indicator L is adjustable or configurable (scalable), respectively, for example in dependence on the dimensions of the relevant display 60. In an advantageous variant or configuration, respectively, the width of the selection indicator L matches the width of the miniaturized desktop A* so that the user can navigate over the entire desktop A by vertically displacing the selection indicator L alone. As is indicated with the crossed arrows P3, the user can also select the indicated section A' of the desktop by directly displacing the desktop A in the navigation area 62, for example by means of a swiping movement in the desired direction, carried out with one or more fingers on the touch-sensitive display 60.

As can be seen in FIG. 3, the navigation area 61 is divided into several navigation part-areas N1, N2, N3. The navigation part-areas N1, N2, N3 correspond, for example, to various applications, production phases and/or data groups. For example, the navigation part-area N1 is provided as preparation area with widgets and content windows for defining a production configuration of a printing production system or printed product processing system, the navigation part-area N2 is provided as production area with widgets and content windows for monitoring and controlling a production or processing of printed products in the printing production system or printed product processing system, and the navigation part-area N3 is provided as distribution area with widgets and content windows for defining and monitoring the delivery of the printed products of the printing production system or printing production processing system, respectively. In one variant, a further navigation part-area is provided as evaluation area for statistical functions, reporting functions and analysis functions relating to the production, processing and/or delivery of printed products in the printing production system or printed product processing system, respectively.

The user interface 6 also comprises a catalog area K1 with a widget inventory 610 with all available but currently inactive widgets. The widget inventory 610 comprises exclusively inactive widgets. As soon as a widget is positioned on the desktop A, it becomes active, i.e. executed, and does not appear in the widget inventory 610. The interface module 9 is configured, in the case of a displacement of a widget from the information area 62 or the navigation part-areas N1, N2, N3 of the navigation area 61 into the widget inventory 610, to remove the relevant widget from the desktop A, to inactivate it and list it in the widget inventory 610 as an available, inactive widget and/or represent it graphically as an icon. Depending on the variant of the embodiment and/or the number of inactive widgets, the widget inventory 610 is wholly and permanently visible for the user or is displayed to the user following the input of a simple user command, for example clicking on a graphical symbol.

The user interface 6 also comprises a log-in area 612 which is configured for receiving user identification and access authorization data and/or indicating the logged-in user, for example as user name, user identification and/or image of the user. The logging-in can also take place, for example, via a contactless or contact-connecting interface which reads the user identification and, in one variant, also the access authorization data from a data medium, for example from a chip card. The user identification and authorization data input and/or read in are checked, for example, in the line master 8 and, in the case of the authorization being present, the user is logged in as active user with his associated authorizations, for example, allocated to the relevant terminal 31-34 where the log-in takes place. In one variant, each user is also allocated to a defined user group.

During the logging-in of a user, the interface module 9 shows the user interface 6 on the relevant display 60 according to the stored configuration data which are allocated to the relevant user, the relevant user group and the relevant display 60 or, respectively, to the relevant associated terminal 31-38. Depending on the configuration data which are listed and stored for a user in a user profile, the user can select during logging-in (or also later via a selectable reset function) whether the user interface 6 at the relevant terminal 31-38 is to be used for a user-specific user or work setting stored in an associated user profile, a stored user-specific basic setting, a stored group-specific basic setting or a generic basic setting for the current configuration and representation of the user interface 6 and the components and areas arranged, positioned and dimensioned therein, such as navigation area 61, information area 62, control bar 63, widgets W1-W5, navigation part-areas N1, N2, N3, content windows F52, selection indicator L, timing bar 631, rapid-access elements 632, etc.

Figure 4A:
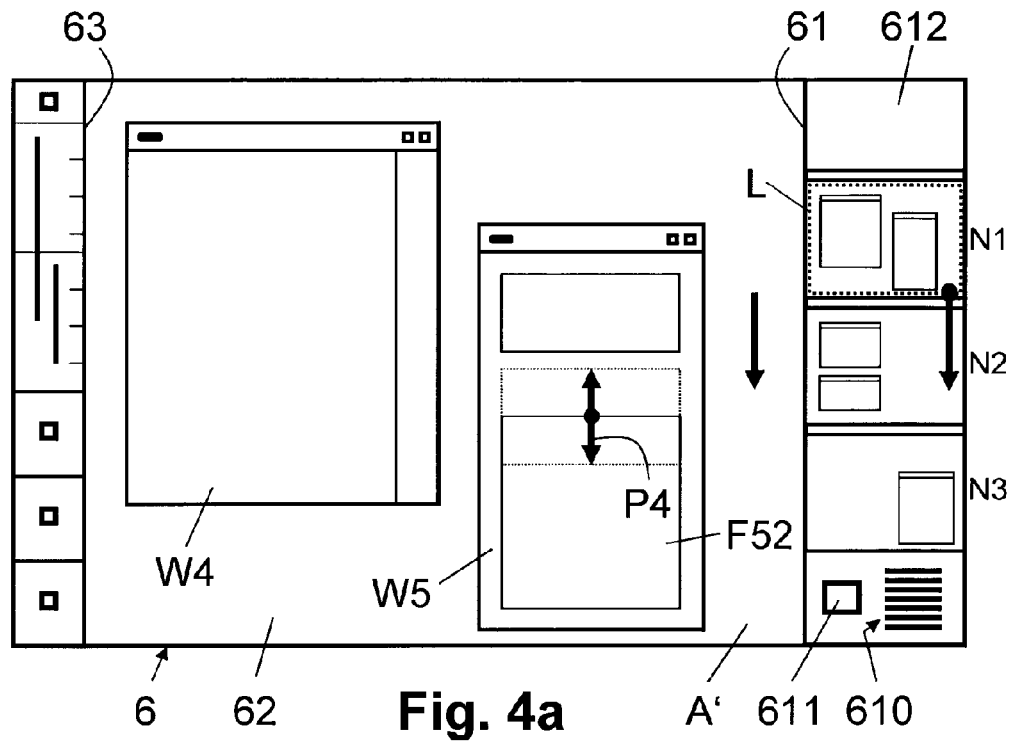
FIGS. 4a, 4b: show in each case the graphical user interface with a different section of the desktop in the information area and a selection indicator positioned correspondingly in the navigation area.
Figure 4B:
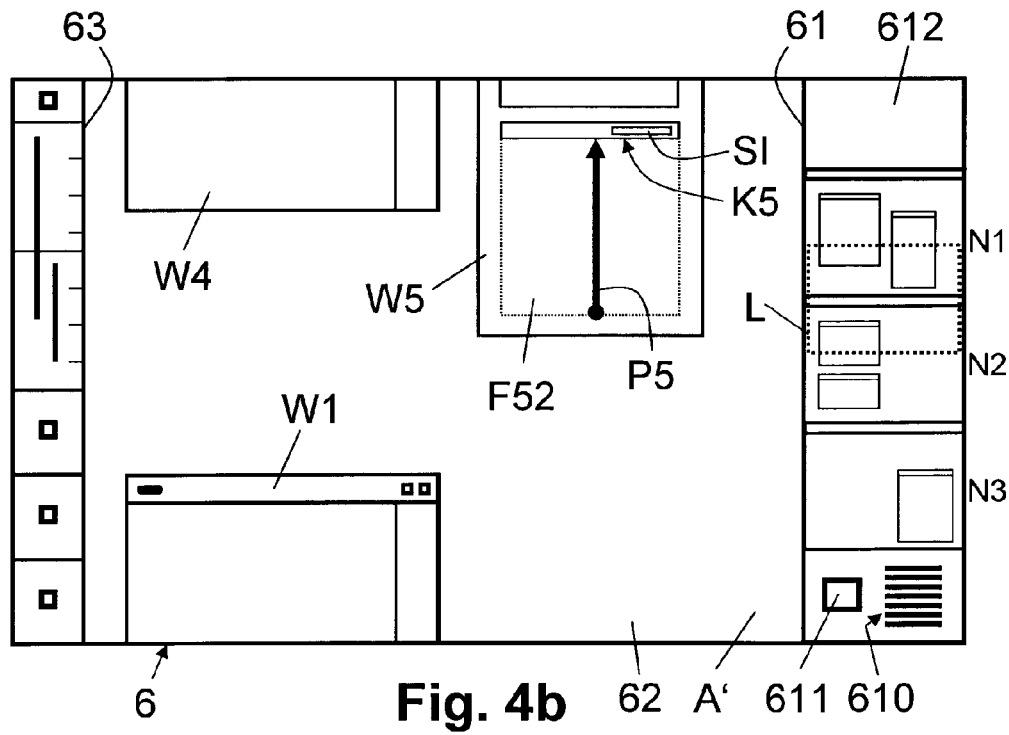

FIGS. 4*a* and 4*b* illustrate the displacement of the section A', shown in the information area 62, of the desktop A with a movement of the selection indicator L over two adjoining adjacent navigation part-areas N1, N2. This displacement can be performed by the user, as described above, by moving the desktop A in the information area 62 or by displacing the selection indicator L in the navigation area 61. As is indicated by arrow P4, content windows F52 of a widget W5 can be changed in their size by the user, the size of the surrounding widget W5 adapting itself correspondingly. As is indicated with the arrow P5, content windows F52 of a widget W5 can be reduced down to their header bar K5 by the user. In one variant, widgets can also be reduced to their header bar by the user. During the reducing of widgets and/or content windows F52, one or more status indicators SI are in each case indicated configurably in the header bar K5, which indicators in each case indicate the current value of status values which are contained in the relevant widget or content window F52, respectively, for example as symbols or values. Depending on execution, application and configuration, several status values can also be combined in a header bar K5 in accordance with predefined or user-defined rules to form a collective status.

Figure 2A:
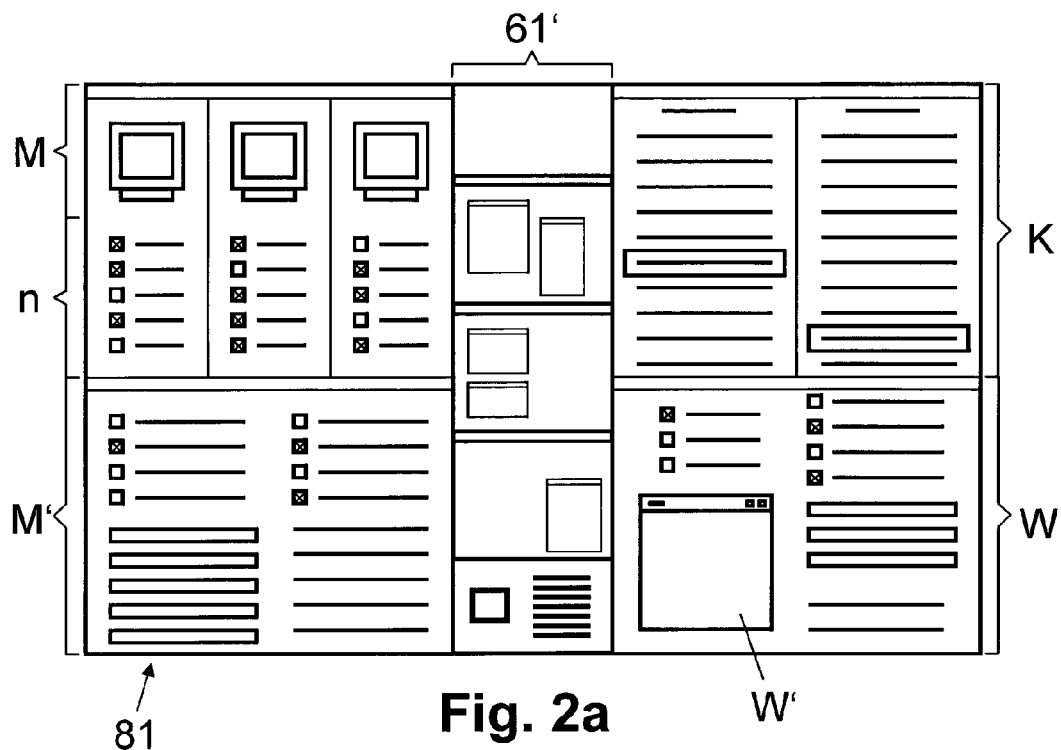
FIGS. 2a, 2b: show in each case a graphical configuration interface with miniaturized representations of a desktop and various terminals, and an input area for individually allocating parts of the desktop to the terminals.
Figure 2B:
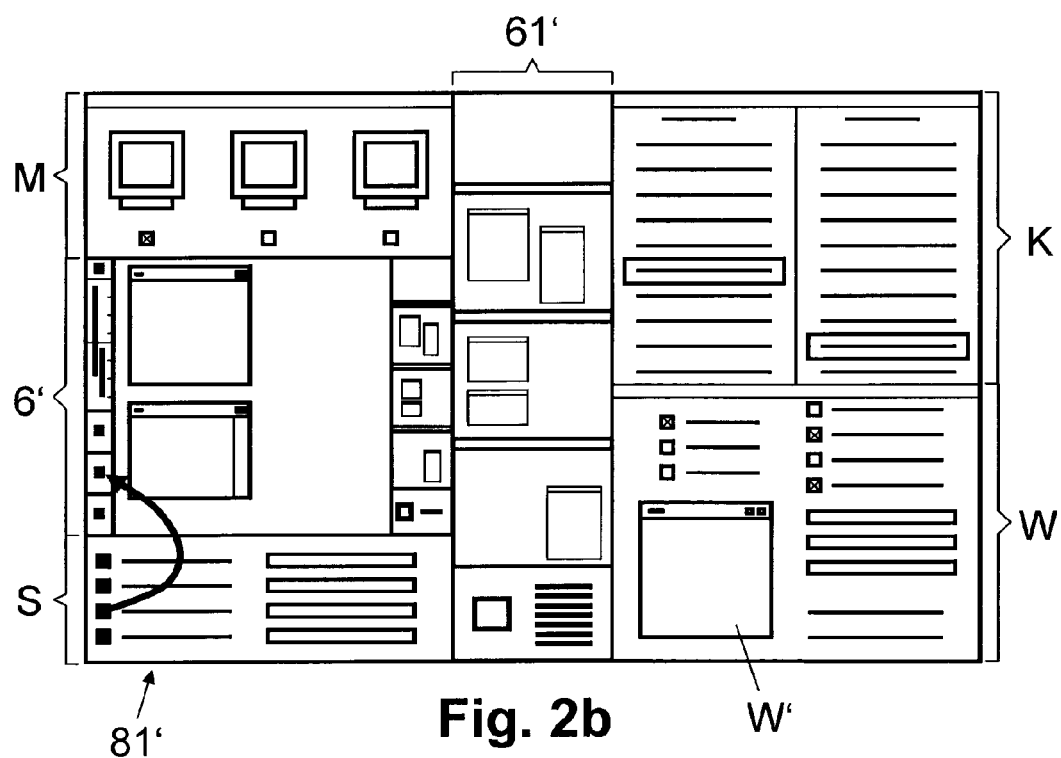

FIGS. 2*a* and 2*b* show examples of a graphical configuration interface 81, 81', generated by the configuration module 80, for configuring the user interfaces 6 for the terminals 11-38 of the production plant 1. The configuration interface 81, 81' is shown, for example, on the display 60 when an authorized user sets a configuration mode, for example by operating a configuration knob 611 in the user interface 6.

The configuration data detected by the configuration module 80 via the configuration interface 81, 81' for configuration of the user interface 6 are preferably stored as defined basic settings for the various displays 60 or terminals 31-38, respectively, of the production plant 1, for example in the line master 8. In addition, the configuration module 80 or the configuration interface 81, 81', respectively, also provides for the definition of group-specific and/or user-specific settings of the user interfaces 6. As a rule, however, user-specific configuration data are determined directly by manipulations by the user in the user interface 6 and stored, allocated to the user, by a profile module of the interface module 9 in a user profile, for example centralized in the line master 8.

As is shown diagrammatically in FIGS. 2*a* and 2*b*, the configuration interface 81, 81' comprises a widget catalog K with widgets which are available in the production plant control system or in the production plant control applications, respectively. The widgets are shown, for example, as graphical symbols or lists with designations, for example structured hierarchically with widget types or classes and available widgets contained therein. A widget W' selected in the widget catalog K can be specified in detail by the user in the widget configuration area W and configured, for example with regard to its size, content windows contained and/or linkages to other widgets.

As can be seen in FIGS. 2*a* and 2*b*, the configuration interface 81, 81' comprises a representation of the navigation area 61' of the user interfaces 6 as described above, with several navigation part-areas which in each case show an associated part of the desktop 6 and the widgets arranged thereon in miniaturized manner. The adjustment of sizes of the navigation part-areas can be performed in the configuration interface 81, 81' preferably directly in the representation of the navigation area 61', for example by correspondingly displacing and setting the area limits. In addition, a navigation part-area can be defined as coupled or decoupled. A navigation part-area defined as coupled is later generated in such a manner that it replicates changes in the relevant part in the other terminals 31-38 to which the relevant part is allocated. A navigation part-area defined as decoupled, in contrast, is generated in such a manner that it does not replicate changes in the relevant part in the other terminals 31-38.

By moving a widget W' from the widget catalog K or from the widget configuration area W to a desired position in a navigation part-area of the navigation area 61' shown, the widgets W' can be positioned by the user on the desktop A via the configuration interface 81, 81'.

Depending on the embodiment, the widgets W' can be exclusively allocated by the user to one or more navigation part-areas or explicitly blocked for one or more navigation part-areas so that a widget W' configured in this manner cannot be displaced by the user into an impermissible navigation part-area N1, N2, N3 in the user interface 6. In the case of an attempt to displace a widget W' into an impermissible navigation part-area, the interface module 9 causes the widget W' to jump back into its original location according to corresponding rules. In one variant of the embodiment, certain widgets W' or classes of widgets' are defined in the widget catalog K in such a way that they can generally only be arranged in certain navigation part-areas or are blocked for certain navigation part-areas, respectively.

The configuration interface 81, 81' also comprises a monitor area M in which the terminals 31-38 or their displays 60, respectively, are graphically displayed, for example, and can be activated by the user via the configuration interface 81, 81' and configured by means of an associated user interface 6.

In the example according to FIG. 2a, the configuration interface 81 comprises a monitor configuration area n in which the defined navigation part-areas can be deliberately and selectively activated and allocated by the user, for example by clicking on a box for a particular terminal 31-38 or its display 60, respectively. In the detailed monitor area M', the user can set further aspects of the user interfaces for the various terminals 31-38 or their displays 60, respectively, for example the control bar 63 by switching-on/-off and configuring the timing bar 631 and by adding/removing and configuring rapid-access elements 632. The rapid-access elements 632 can be allocated to a widget, a certain position on the desktop A or to a defined section A' of the desktop A so that, when the relevant rapid-access element 632 is actuated, the corresponding section A' of the desktop A with the possibly allocated widget is shown in the information area 62 and the selection indicator L indicates the corresponding part-area of the desktop A*, shown miniaturized, with the relevant miniaturized widget arranged thereon, in the navigation area 61. However, the rapid-access elements 632 are preferably configured in such a manner that they can be allocated a widget not only via the configuration interface 81 but also in the user interface 6 by the user in running operation. The rapid-access elements 632 and the widgets are coupled, for example, in such a way that the user can perform the dynamic allocation in the user interface 6 by moving (dragging) the relevant widget from the desktop A or from the desktop A* shown miniaturized to the desired rapid-access element 632 to be allocated and positioning or dropping it there. In this dynamic allocation of a widget to a rapid-access element 632, there is, however, no repositioning of the widget on the desktop A or the desktop A* shown miniaturized.

In the example according to FIG. 2b, the configuration interface 81' comprises for a terminal 31-38 selected in the monitor area M, or its display 60, respectively, a miniaturized representation 6' of its associated user interface 6' according to the current configuration as described above with a control bar, an information area and a navigation area having several navigation part-areas. The configuration of a user interface can be performed directly by the user in the miniaturized representation 6', in particular, the defined navigation part-areas can be deliberately and selectively activated and allocated by the user for the user interface of a particular terminal 31-38 or its display 60, respectively. The control bar can be additionally defined for a certain terminal 31-38 or its display 60, respectively, in a corresponding control bar configuration area S and configured, for example, by selecting and moving components of the timing bar 631 or of rapid-access elements 632 from the configuration area S into the miniaturized representation of the control bar for the relevant user interface 6' as is indicated by the arrow in FIG. 2b.

The configuration of the user interfaces 6 for the various terminals 31-38 or their displays 60, respectively, and the associated configuration of the desktop A and associated navigation part-areas N1, N2, N3 is stored by the configuration module 80, for example in the line master 8 and/or in the terminals 31-38.

As has been explained above with reference to FIGS. 3, 4a and 4b, the section A', shown in the information area 62, of the desktop A, can be displaced and changed by moving the selection indicator L in the navigation area 61 or by moving the desktop 6 in the information area 62. The user interface 6 defined by the configuration module 80 and generated by the interface module 9 is also configured in such a manner that widgets can be displaced and repositioned by the user on the desktop A during the production operation.

Figure 5:
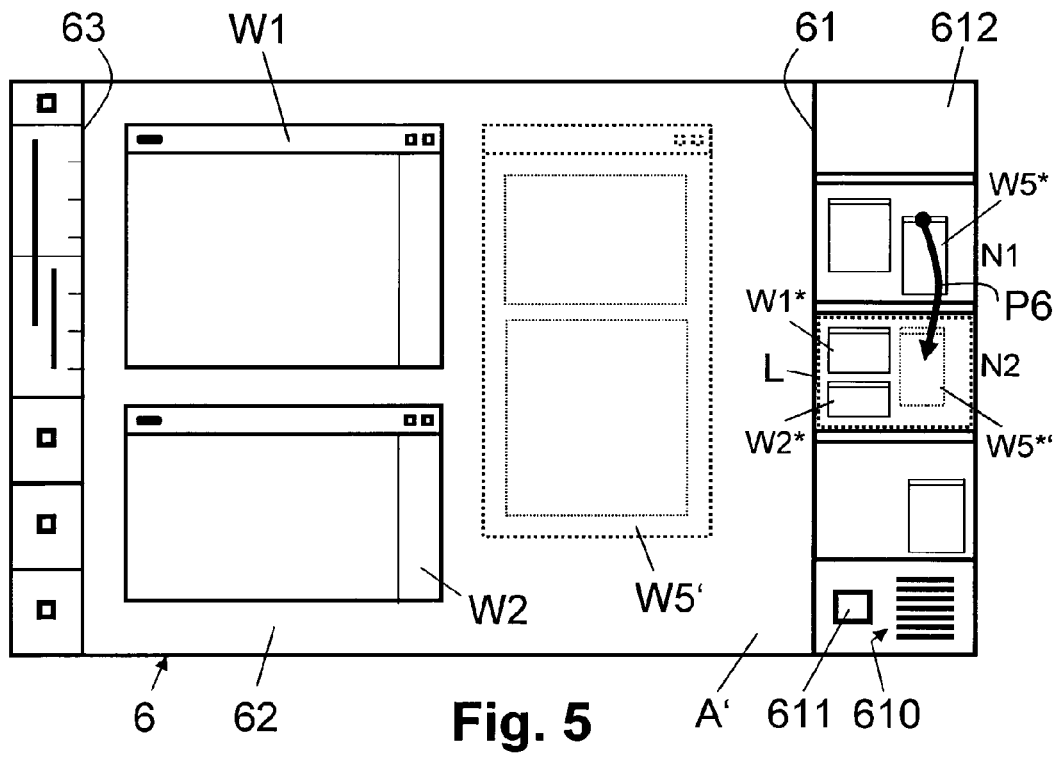
FIG. 5: illustrates in the user interface diagrammatically how the displacement of a miniaturized widget in the navigation area produces a corresponding positioning of the relevant widget on the desktop.

FIG. 5 diagrammatically illustrates that widgets can be repositioned by the user by correspondingly moving the miniaturized representation of the relevant widget W5* in the navigation area 61. As is indicated by arrow P6 in the example of FIG. 5, the displacement is carried out, for example, in that the header bar of a (miniaturized) widget is acquired, for example by positioning of a pointer by means of a computer mouse, of a tracker ball or of a touchpad, or preferably by suitably positioning one or more fingertips on the touch-sensitive display 60, and is then displaced to the desired position, for example by correspondingly dragging the pointer or the fingertips, respectively, on the screen of the display 60 and dropping at the desired position. In the example of FIG. 5, the boundary-crossing displacement of the miniaturized widget W5* from the navigation part-area N1 to the new position, designated by the reference symbol W5*' in the navigation part-area N2 produces a corresponding displacement, indicated by the reference symbol W5', and repositioning of the relevant widget W5 from an area, not visible in the information area 62, of the desktop A into the section A' of the desktop, shown in the information area 62.

It should be noted at this point that widgets shown miniaturized in the figures are marked by an asterisk (*), that repositionings and changes are marked with an apostrophe ('), and that the repositioning of an object shown miniaturized is marked with the combination *' or a miniaturized representation of a repositioned miniaturized object is marked by the combination '*.

Figure 6:
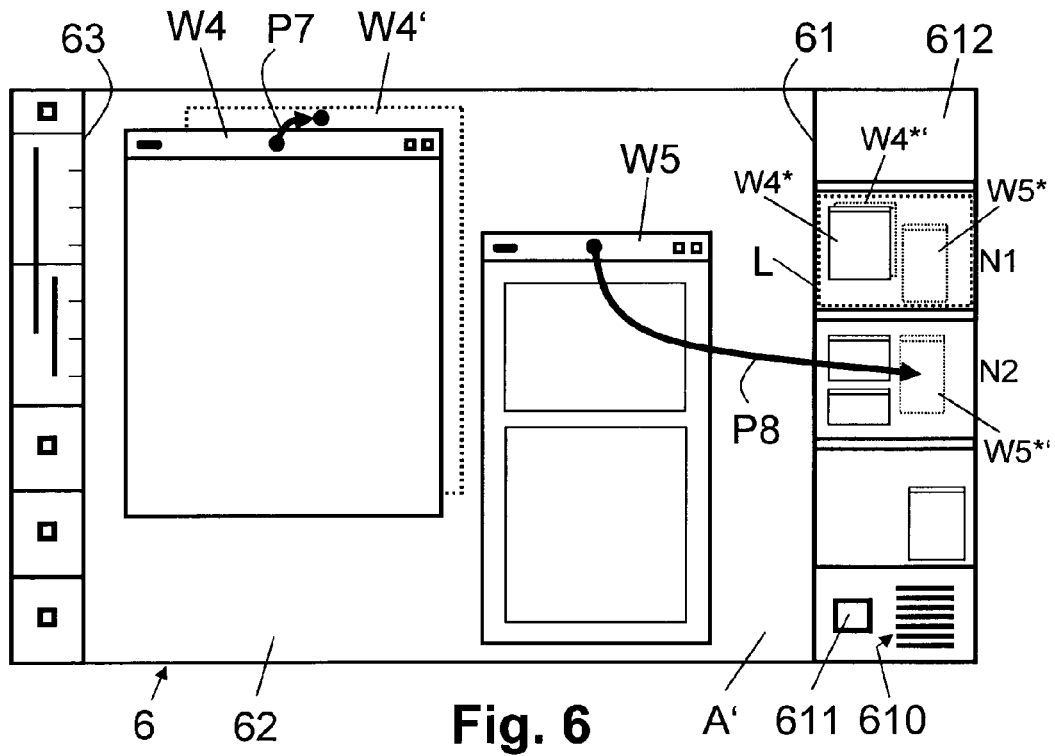
FIG. 6: illustrates in the user interface diagrammatically displacements of a widget in the information area, a widget being positionable on the entire desktop by displacement from the information area into the navigation area.

FIG. 6 illustrates a further option for the user to displace a widget on the desktop A in the user interface 6 in that the relevant widget W4, W5 in the information area 62 is acquired directly in the section A' shown and displaced into the navigation area 61 or the information area 62 at another position in the section A'. As is indicated by the arrow P7 in the example of FIG. 6, the widget W4 is displaced to a new position, designated by the reference symbol W4', directly in the section A' shown on the desktop A, which produces a displacement of the miniaturized widget W4* to the miniaturized widget W4*' in the navigation area 61. On the other hand, the widget W5 is displaced from the section A' shown in the information area 62 into the navigation part-area N2 of the navigation area 61 which produces a displacement out of the section A' shown in the information area 62 to an area, not visible in the information area 62, of the desktop A, and a displacement of the miniaturized widget W5* to the miniaturized widget W5*' in the navigation area 61.

Figure 7:
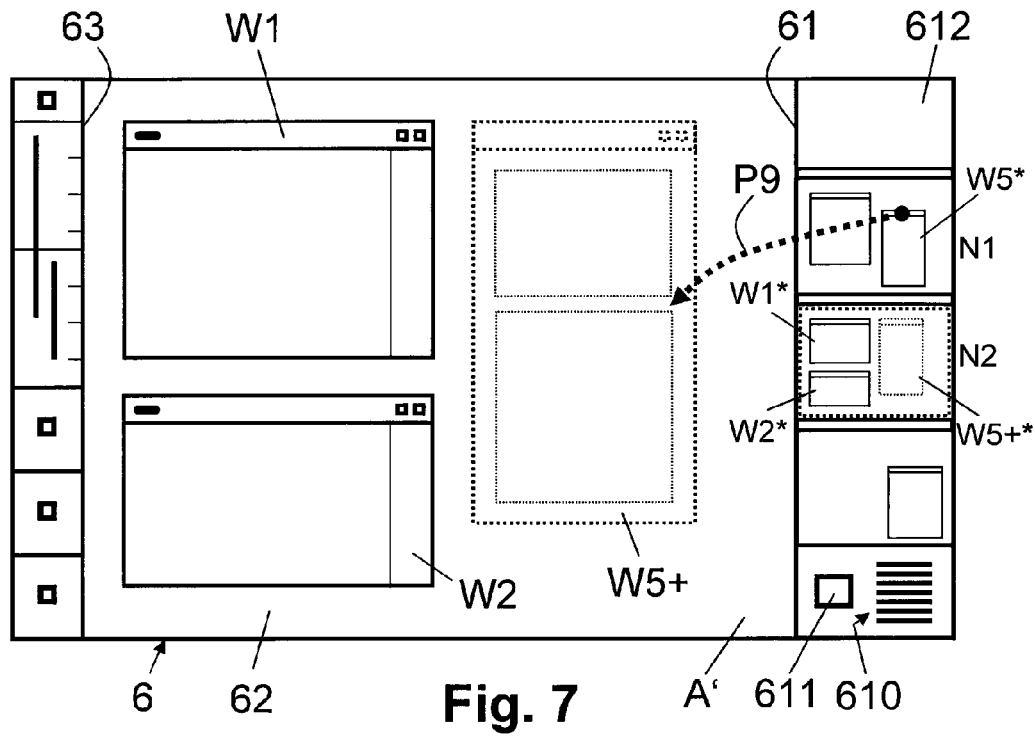
FIG. 7: illustrates in the user interface diagrammatically the displacement of a widget from the navigation area into the information area, a copy of the widget from the navigation area being generated in the section of the desktop which is shown in the information area, when the copying mode is set.

FIG. 7 illustrates by means of an example how users of a widget W5 on the desktop A can generate a copy at another position on the desktop A in the user interface 6. As is indicated by the dashed arrow P9 in the example of FIG. 7, the user, in a copying mode set by the user, moves a miniaturized representation of a widget W5* from the navigation area 61 into the section A', visible in the information area 61, of the desktop A which produces the generation of a copy of the corresponding widget W5 designated by the reference symbol W5+, the copy in the navigation part-area N2 being represented by the widget W5+* shown miniaturized. If no copying mode is set, a displacement of the miniaturized widget W5* from the navigation part-area N1 into the active section A* in the information area 62 produces a corresponding displacement of the relevant widget W5 on the desktop A and correspondingly a displacement of the miniaturized widget W5* from the navigation part-area N1 into the navigation part-area N2.

Figure 8:
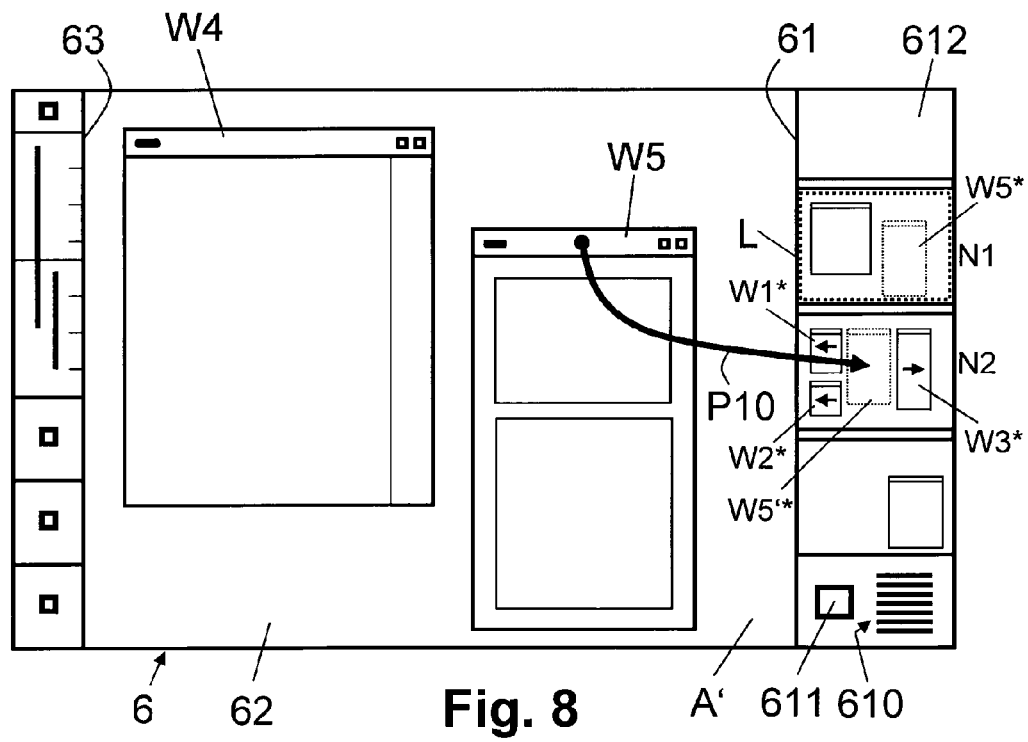
FIG. 8: illustrates in the user interface diagrammatically a rearrangement of widgets in the case of a displacement of a widget from the information area into the navigation area at one point between two widgets.

FIG. 8 illustrates by means of an example the rearrangement of widgets produced by the interface module 9 in the user interface 6 when a widget W5 is moved at a position on the desktop A which does not have sufficient space for a non-overlapping positioning of the widget and, without rearrangement of the widgets, would lead to the moved widget overlapping other widgets. As is shown diagrammatically in the example of FIG. 8, the widgets W1*, W2*, W3* shown miniaturized, are displaced horizontally in each case during the movement of the widget W5, indicated by arrow P10, from the section A' shown into the navigation part-area N2, not visible in the information area 62, in such a manner that sufficient space is created for an overlap-free positioning of the widget shown miniaturized, designated by the reference symbol W5'*. Due to the proportional representation of the desktop A and the widgets arranged thereon in the navigation area 61, the rearrangement of the miniaturized widgets W1*, W2*, W3* in the navigation area 61 in the user interface 6 is accompanied by a corresponding rearrangement of the corresponding widgets W1, W2 and W3 on the relevant part of the desktop A not visible in the information area 62.

Figure 9A:
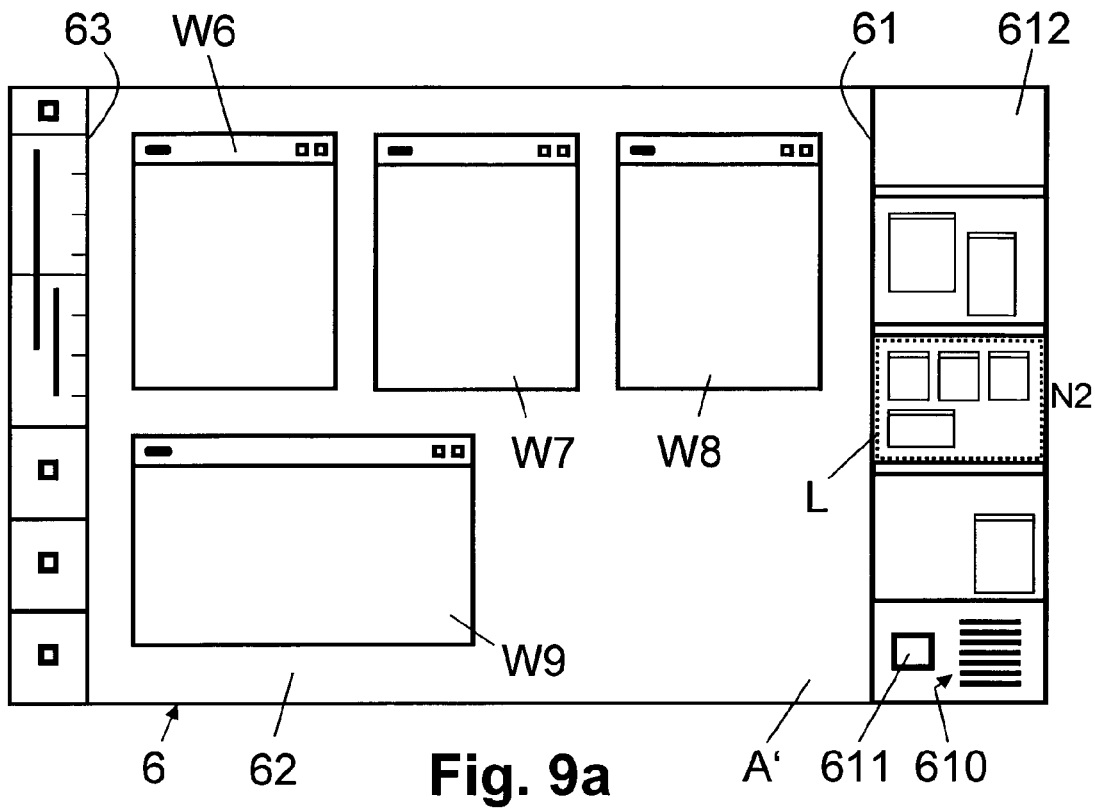
FIGS. 9a, 9b: illustrate in the user interface diagrammatically a rearrangement of widgets in the case of an enlargement of a widget in the information area which produces a displacement, i.e. repositioning, of other widgets.
Figure 9B:
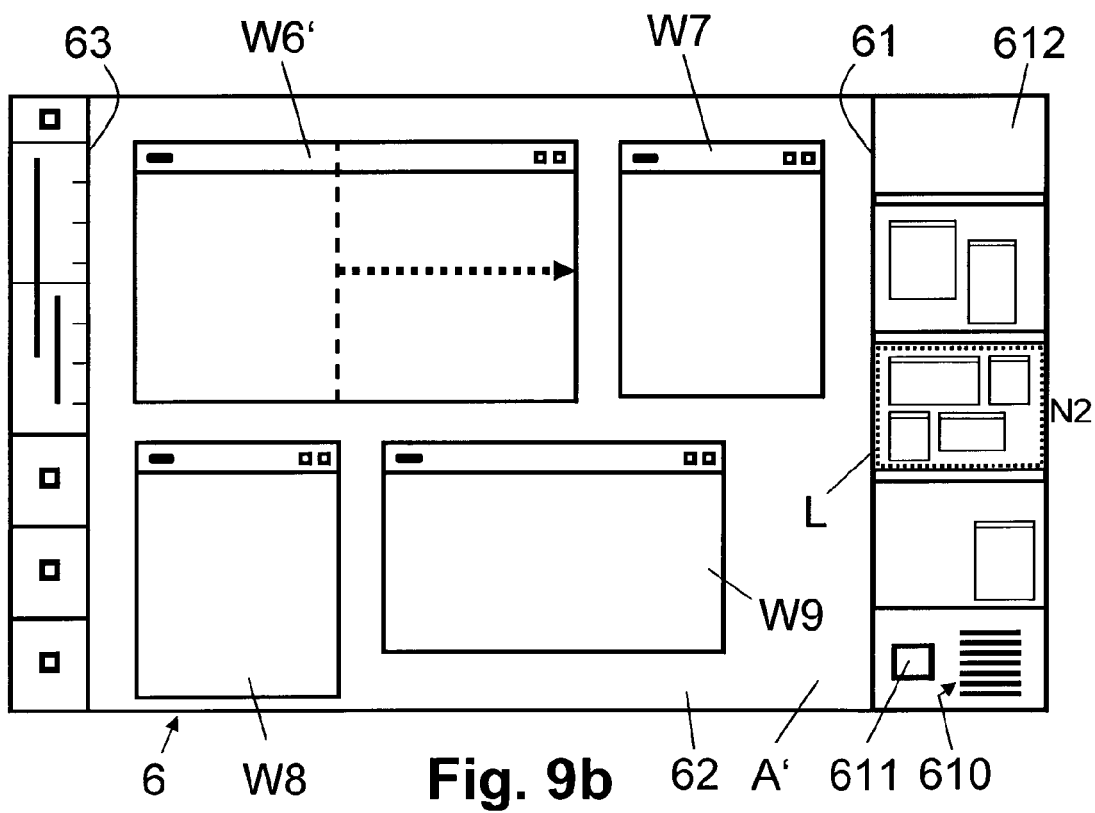

FIGS. 9a and 9b illustrate by means of an example the rearrangement of widgets, produced by the interface module 9 in the user interface 6, when a widget W6 is enlarged in its dimensioning by the user in such a manner that without rearrangement of the widgets, an overlap of the enlarged widgets with other (adjacent) widgets would be caused. FIG. 9a illustrates the starting position with the widgets W6, W7, W8 and W9, arranged free of overlap, of the section A' shown in the information area 62 and the corresponding widgets W6*, W7*, W8* and W9*, shown miniaturized, in the corresponding navigation part-area N2 in the navigation area 61.

FIG. 9b diagrammatically illustrates the rearrangement, generated automatically by the interface module 9 in the user interface 6, of the widgets W7, W8, W9 or the corresponding widgets W7*, W8* and W9*, shown miniaturized in the case of an enlargement, designated by the reference symbol W6', of the widget W6. In addition to the horizontal displacement of widgets in the example of FIG. 8, the interface module 9 in the example of FIGS. 9a and 9b also produces a line break in the user interface 6 since the horizontal displacement of the widgets 8 without line break would lead to a positioning outside of the defined desktop A. Such a rearrangement of widgets with a line break is also carried out in the case of widgets being positioned in the navigation area 61 in accordance with the example of FIG. 8 if widgets are pushed over the side edge (width) of the desktop A by the rearrangement.

Figure 10:
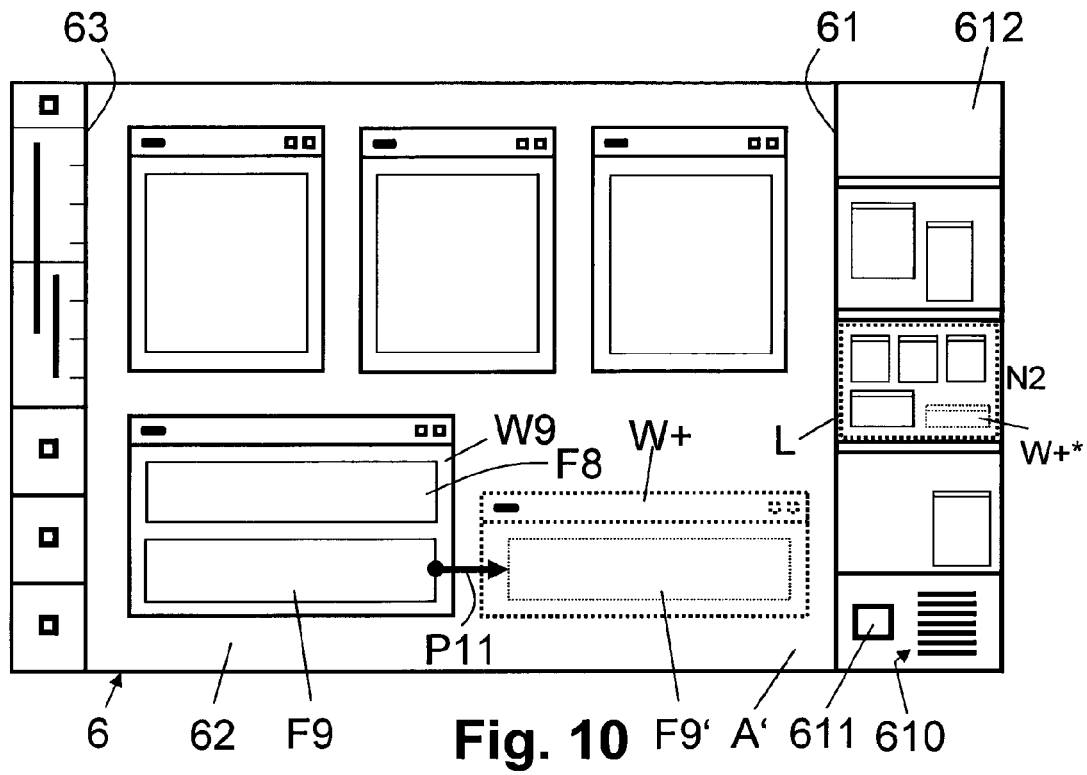
FIG. 10: illustrates in the user interface diagrammatically the representation of widgets with content windows and the generation of a widget with a content window which is pulled out of an existing widget.

FIG. 10 diagrammatically illustrates a further user operation which is supported and carried out by the user interface 6 or the interface module 9, respectively. As is indicated by the arrow P11, content windows F9 can be detached by the user out of their widgets W9 into which they are embedded and can be positioned in a newly generated separate widget W+ on the desktop A. In the example of FIG. 10, the content window F9 is acquired by the user, as indicated by the arrow 11, and moved completely out of the starting widget W9 and positioned outside the starting widget W9 on the desktop (drag and drop). In this process, the interface module 9 generates a new widget W+ into which the content window F9 pulled out is embedded by the interface module 9. As can be seen in FIG. 10, the new widget W+ is shown miniaturized in the relevant navigation part-area N2 in the navigation area 61 as designated by the reference symbol W+*.

Figure 11:
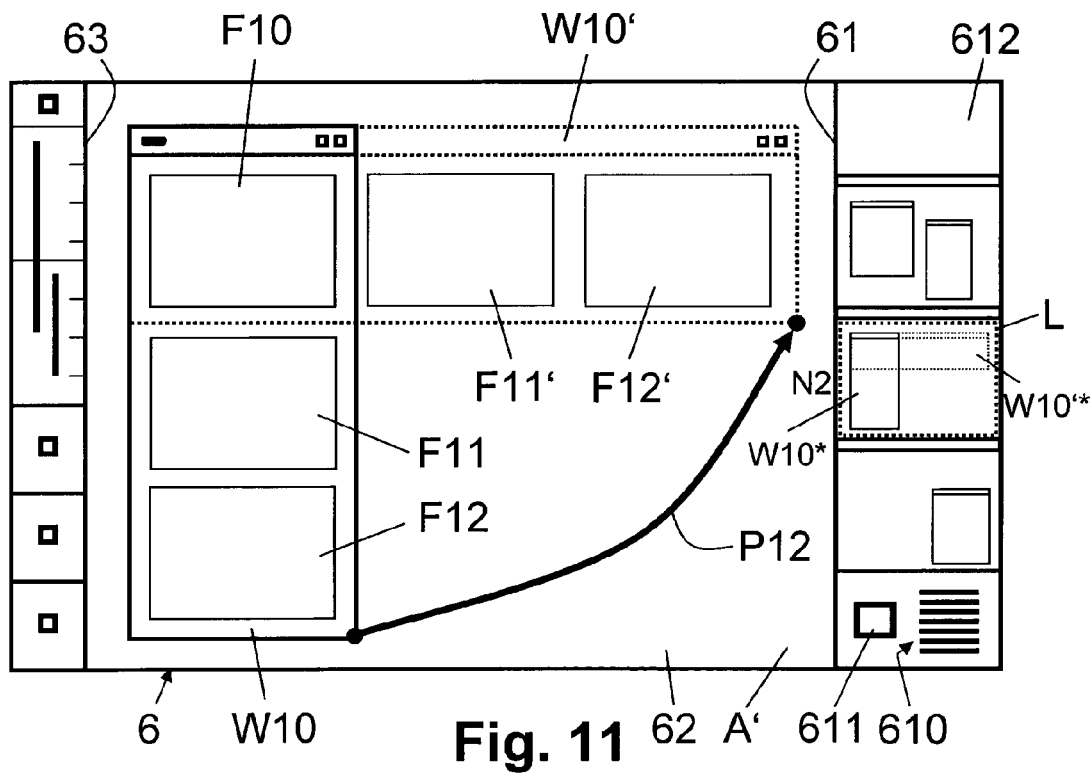
FIG. 11: illustrates in the user interface diagrammatically a rearrangement of content windows in a widget in the case of a change of shape of the relevant widget.

FIG. 11 diagrammatically illustrates a further user operation supported by the user interface 6 or the interface module 9, respectively. As is indicated by the arrow P12, a widget W10 is redimensioned by the user in such a manner that the ratio of its width to its height is essentially reversed in the redimensioned widget W10'. As can be seen in FIG. 11, in this case the interface module 9 performs a reordering of the content windows F11, F12 of the starting widget W10 in the user interface 6 so that the content windows designated by the reference symbols F11', F12' are arranged free of overlap next to one another in the newly dimensioned widget W10'. If necessary, the interface module also performs a size adaptation of the redimensioned widget W10' in this process in order to provide for a complete representation of the newly arranged content windows F10, F11', F12' without necessary scrolling. As is shown in FIG. 11, the miniaturized representation of the widget W10* is correspondingly adapted in the relevant navigation part-area N2 as is indicated by the reference symbol W10'*.

Figures 12A, 12B:
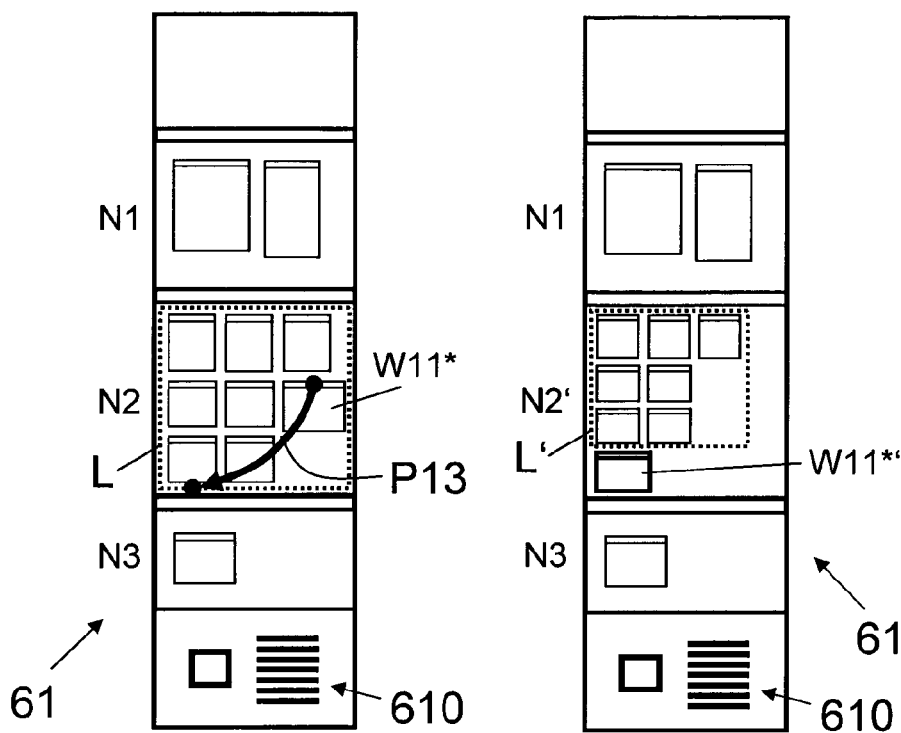
FIGS. 12a, 12b: illustrate diagrammatically the arrangement and scaling of a navigation part-area in the case of a displacement of a widget shown miniaturized in the relevant part-area at a point having insufficient space for the widget.

FIGS. 12a and 12b illustrate the behavior, controlled by the interface module 9, of the navigation area 61 in the positioning of a widget at a position in the navigation part-area N2 having insufficient space for an overlap-free representation of the miniaturized widgets. In this context, the widget to be newly positioned can be displaced from the information area 62 into the navigation area 61 or displaced within the navigation area 61. As is indicated in the example of FIGS. 12a and 12b by the arrow P13, the miniaturized widget W11* is displaced within the navigation part-area N2 to a position on the lower edge where there is too little space for an overlap-free positioning of the widget. As can be seen in FIG. 12b, the interface module 9 generates a scaled representation of the navigation part-area N2', wherein both the selection indicator designated by the reference symbol L' and the miniaturized widgets are reduced in size so that the displaced miniaturized widget designated by the reference symbol W11*' can be positioned free of overlap in the navigation part-area N2', wherein it is also shown scaled correspondingly. In one embodiment, the part of the desktop A allocated to the navigation part-area N2', and thus the entire desktop A, is correspondingly enlarged. In another variant, the entire area of the desktop A remains identical and the part of the desktop A which is allocated to the navigation part-area N2' is extended to another part of the desktop A which becomes correspondingly smaller.

Figures 13A, 13B:
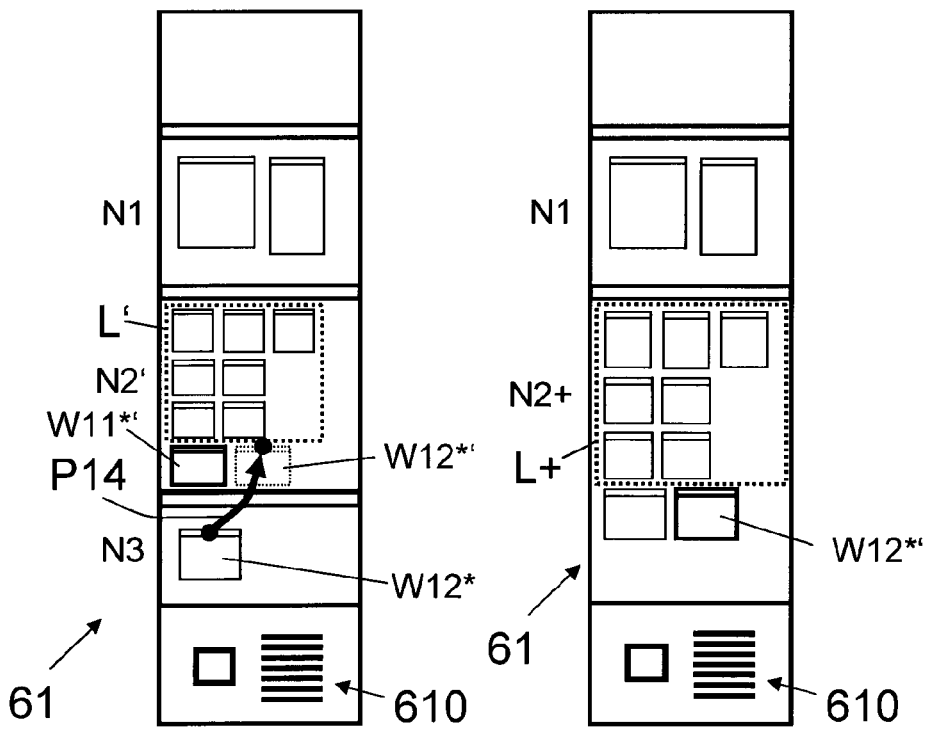
FIGS. 13a, 13b: illustrate diagrammatically the dissolution of a navigation part-area in the case of a displacement of the single widget present in the relevant part-area into another navigation part-area.

FIGS. 13a and 13b illustrate the behavior, controlled by the interface module 9, of the navigation area 61 during the emptying of a navigation part-area N3 by displacement of the only miniaturized widget W12* remaining therein. As is indicated by the arrow P14, the only miniaturized widget W12* in the navigation part-area N3 is displaced from this into another navigation part-area N2' so that after the displacement, no widget remains in the navigation part-area N3. As can be seen in FIG. 13a, the repositioned widget W12*' in the scaled navigation part-area N2' is also shown correspondingly scaled. As is shown diagrammatically in FIG. 13b, the emptied navigation part-area N3 is removed from the navigation area 61, for example after the user has first demanded a confirmation that the navigation part-area N3, which has become empty due to the displacement of the miniaturized widget W12*, is actually ready to be deleted from the navigation area 61 of the user interface 6. A deleted navigation part-area N3 can be activated again in the navigation area 61 at any time via the configuration interface 81, 81' described above with reference to FIGS. 2a and 2b. As can be seen in FIG. 13b, the navigation part-area designated by the reference symbol N2+ and the miniaturized widgets arranged therein and the selection indicator L+ are shown again unscaled in their original size after the empty navigation part-area N3 has been removed and, as a result, sufficient space was created again for an unscaled representation.

In a further user operation, two or more widgets can be strung together on the desktop A, for example by pushing in each case two adjacent sides together, and then moved as a unit on the desktop A until they are separated from one another again by a defined operation, for example by a "shaking movement" of the combined unit object on the desktop A by means of a corresponding finger or mouse manipulation.

In the sections following, various examples of actions and applications which can be defined and triggered by the user via the user interface 6 by supplying content windows and/or data elements selected therein from a source widget to a target widget are described with reference to FIGS. 14a, 14b, 15a-c and 16a-c.

Figure 14A:
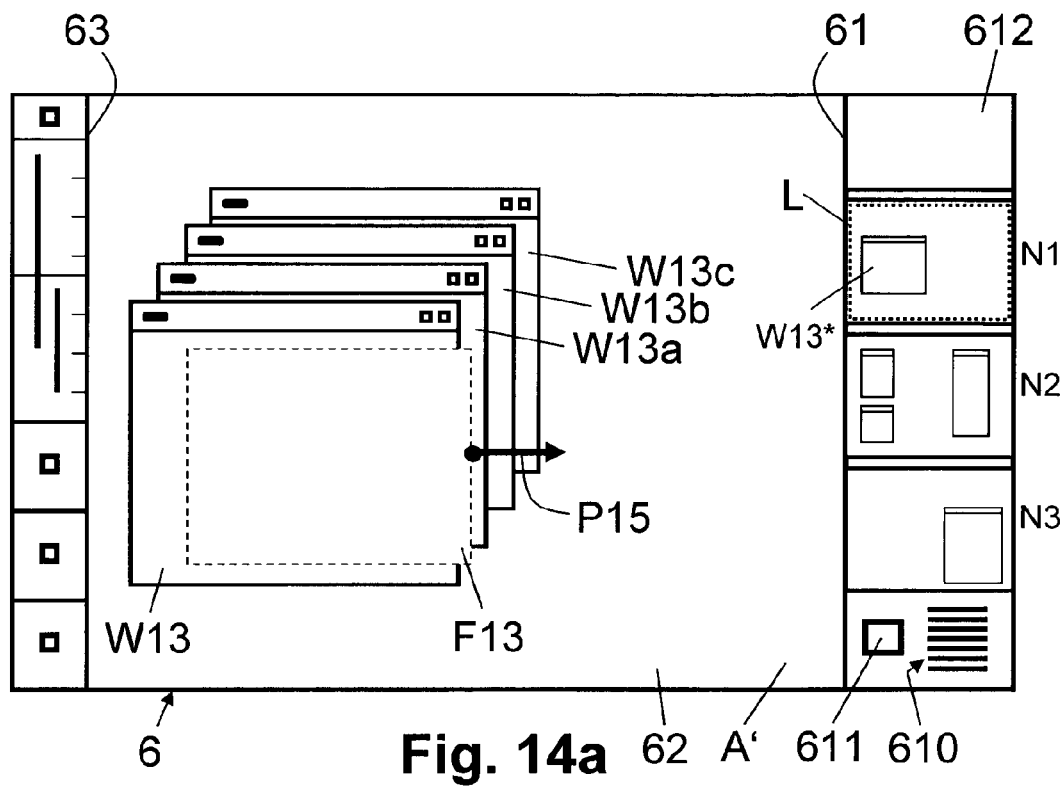
FIGS. 14a, 14b: illustrate diagrammatically the movement of a content window or data elements selected therein from a source widget into a target widget for the purpose of processing, possible linkable target widgets being shown cascaded for selection.
Figure 14B:
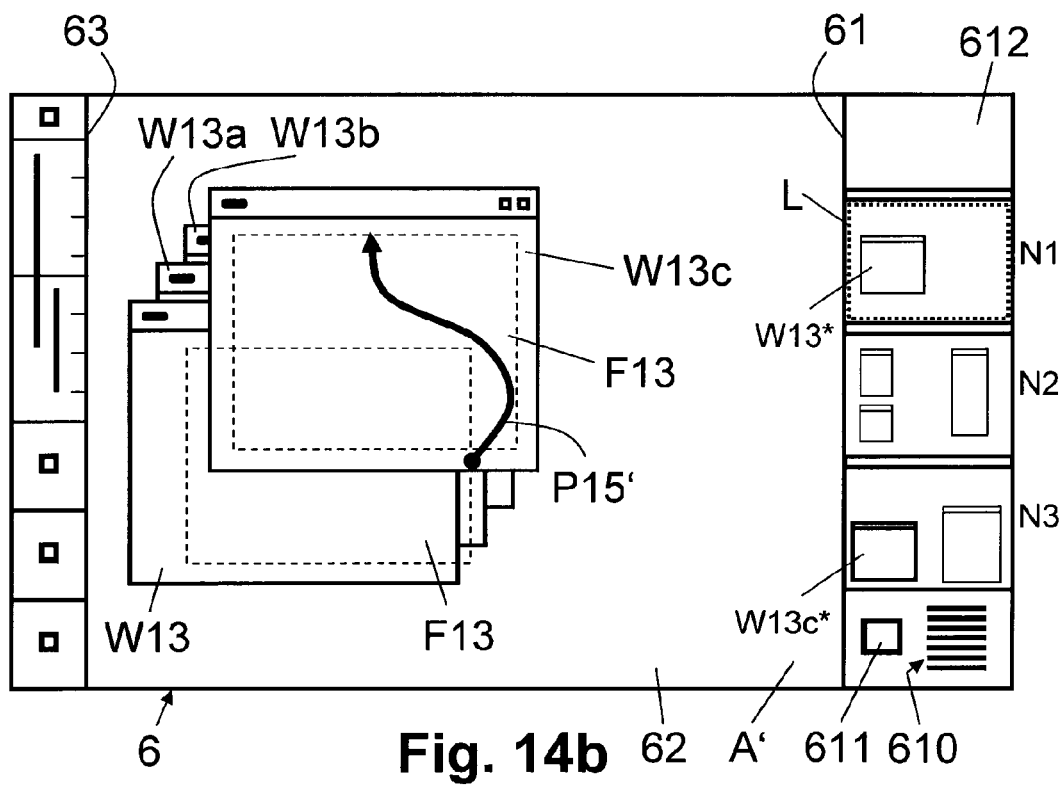

FIGS. 14a and 14b illustrate an example in which a content window F13 and the data elements contained therein or selected therein are transferred, starting from a source widget W13 for further processing to one of several possible target widgets W13a, W13b, W13c, to which a defined action or application is in each case allocated. As is indicated by the arrow P15, the user is shown the various possible target widgets W13a, W13b, W13c cascaded behind the source widget W13, i.e. stacked behind one another in the manner of roof tiles when the user moves the content window F13 to be processed or the data elements selected therein out of the source widget W13 without positioning it on the desktop A or on the section A' shown in the information area 62, respectively. The possible target widgets W13a, W13b, W13c are presented to the user, for example, in such a manner that alternately in each case one is arranged frontmost in the cascade and made visible to the user without being covered by other widgets. The possible target widgets W13a, W13b, W13c are determined in dependence on the source widget W13 and/or the selected content window or data elements, respectively, for example in accordance with an allocation permanently configured via the configuration interface 81, 81' or in dependence on a defined type or class of the source widget W13 and/or of the selected content window or the selected data elements, respectively. As a rule, the possible target widgets W13a, W13b, W13c comprise a defined widget which is configured for generating a copy of the content window positioned therein or the data elements deposited therein, respectively. Less generic target widgets W13a, W13b, W13c comprise actions, functions and applications in the graphical printing field, in the printed-product-processing industry and/or in the field of logistics and transportation which are executed for the relevant content window or the relevant data elements, respectively. As is indicated by the arrow 15, the user, by moving the selected content window F13 or the selected data elements, respectively, into or onto the desired target widget W13c can trigger the allocation and the processing of the data elements to or in the target widget W13c, respectively. The target widget W13c via which the selected data elements are moved by the user is in each case indicated foremost completely visible for the user by the interface module 9. Dropping and positioning the selected content window F13 or the selected data elements, respectively, in the selected target widget 13c definitively triggers their allocation and processing. As is shown diagrammatically in FIG. 14b, the position of the selected target widget W13c in which the selected data elements are processed, is indicated in the navigation area 61 by (in this case bold) marking of the corresponding widget W13c* shown miniaturized. If the selected target widget W13c was not active before, it will now be removed out of the widget inventory 610 of the inactive widgets.

Figure 15A:
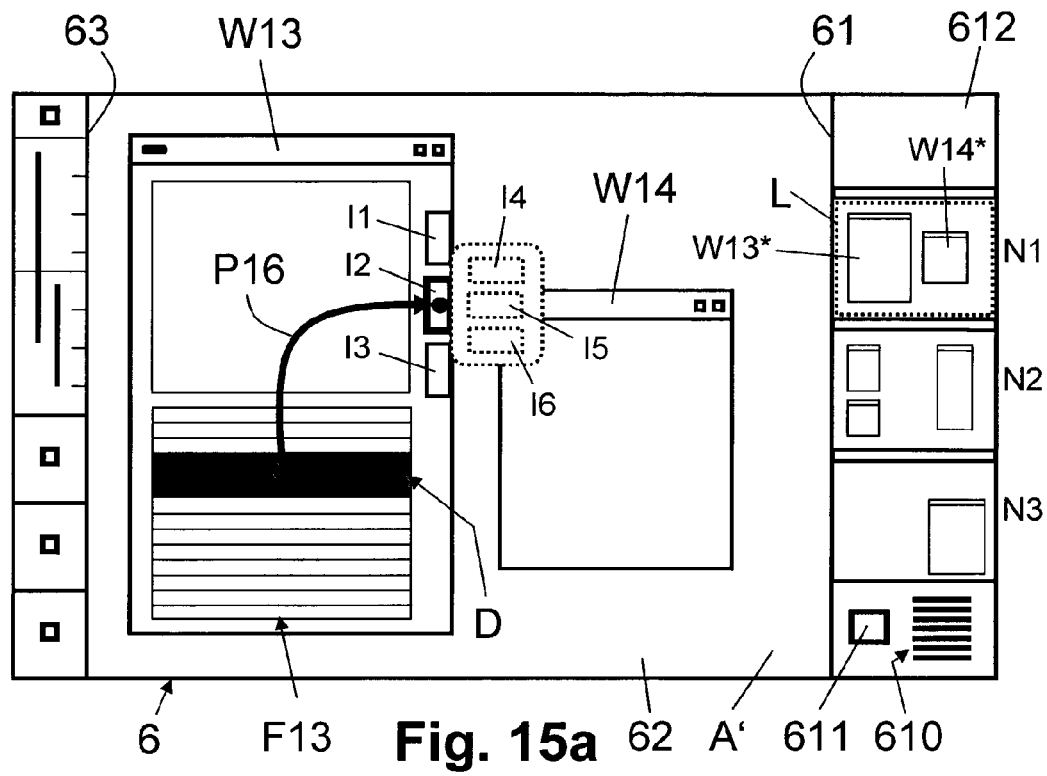
FIGS. 15a-16c: illustrate diagrammatically the movement of a content window or of data elements selected therein from a source widget into a target widget for the purpose of processing, a processing action to be executed being determined by deposition on a symbol or a cell of a holding matrix.
Figure 15B:
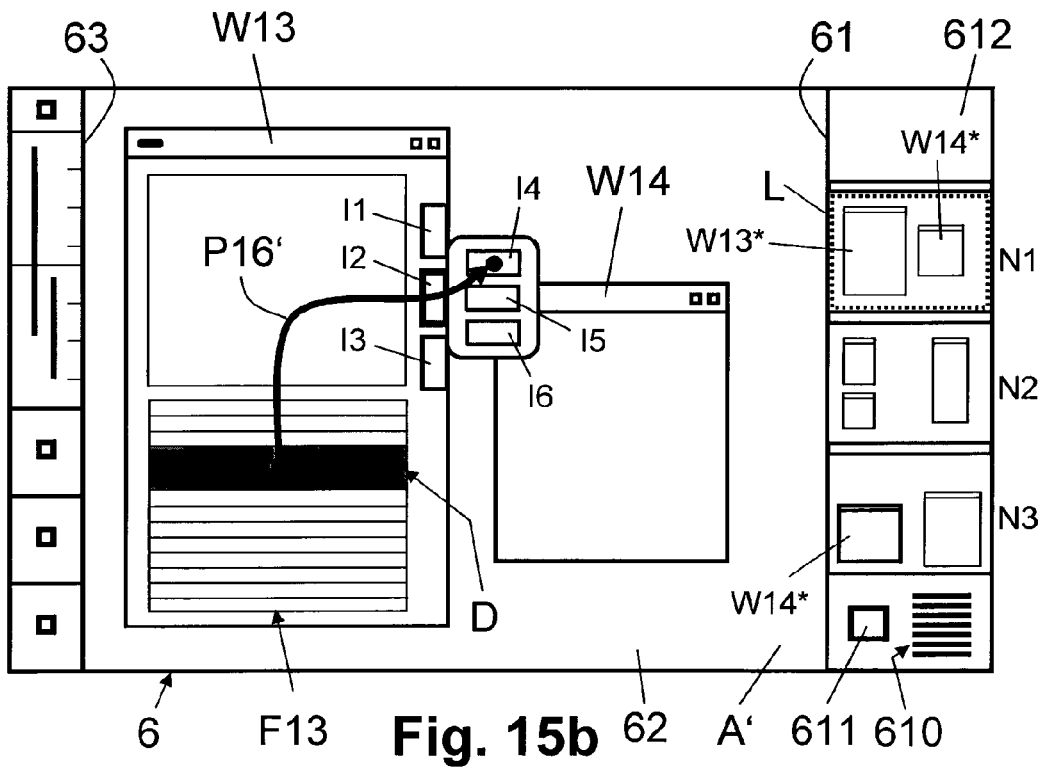
Figure 15C:
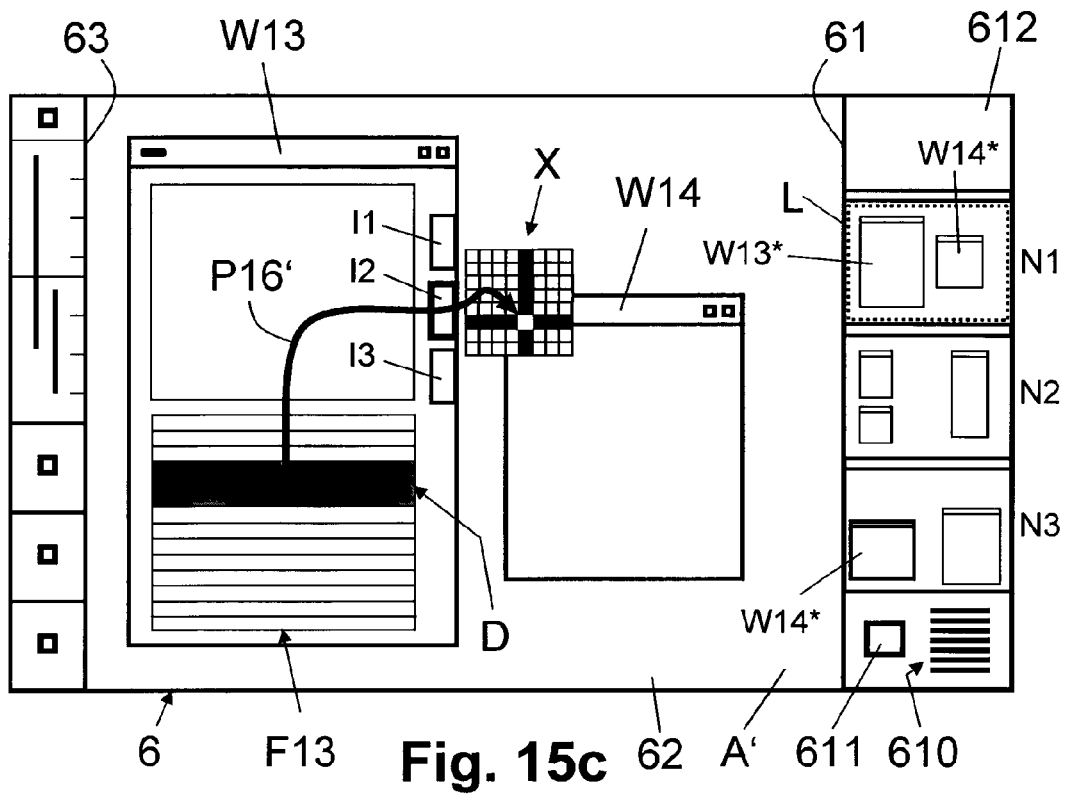

In the example of FIGS. 15a-15c, the source widget W13 comprises indicators I1, I2, I3, visible to the user, of other widgets which, as possible target widgets W14, are connected to the source widget W13 or linked via a logical allocation, respectively. These indicators are designed, for example, as graphical symbols (icons) and/or legible designations. As is indicated by the arrow P16, the user is shown possible processing actions of a target widget W13 when he moves a content window F13 or data elements D, selected therein, from the source widget via an indicator I1, I2, I3 of a selected target widget 14. The possible processing actions of the target widget W13 are indicated to the user, for example, again as visible indicators I4, I5, I6 in the form of graphical symbols and/or legible designations. When the user moves (drags) the content window F13 or the data elements D selected therein, as indicated by the arrow P16', to the indicator I4 of the desired processing action and positions (drops) it there, the content window F13 or the data elements D selected therein are transferred to the target widget W14 for processing in accordance with the processing action determined by the relevant indicator I4. As is shown diagrammatically in FIG. 15b, the position of the selected target widget W14, in which the selected data elements are processed, is indicated in the navigation area 61 by (in this case bold) marking of the corresponding widget W14* shown miniaturized. If the selected target widget W14 was previously not active, it will now be removed from the widget inventory 610 of the inactive widgets.

In FIG. 15c, a variant is illustrated in which the allocation of the content window F13 or of the data elements D selected therein to a selectable processing action of the selected target widget W14 is determined by the user via a holding matrix X indicated by the interface module 9. The holding matrix X preferably comprises two combinable criteria for determining the processing action by positioning of the content window F13 or the data elements D selected therein in a correspondingly selected cell of the matrix, the two criteria being mapped onto the rows or columns, respectively, of the matrix X. For example, the row position determines a production time and the column position determines a particular production case or production path in the production plant 1 so that the processing of the data elements of the content window F13 can be allocated both to a particular production time window and to a particular production case with a corresponding positioning in the holding matrix X. The position of the selected target widget W14 is again marked in the navigation area 61 and the target widget W14 is removed from the widget inventory 610 of the inactive widgets, if necessary.

Figure 16A:
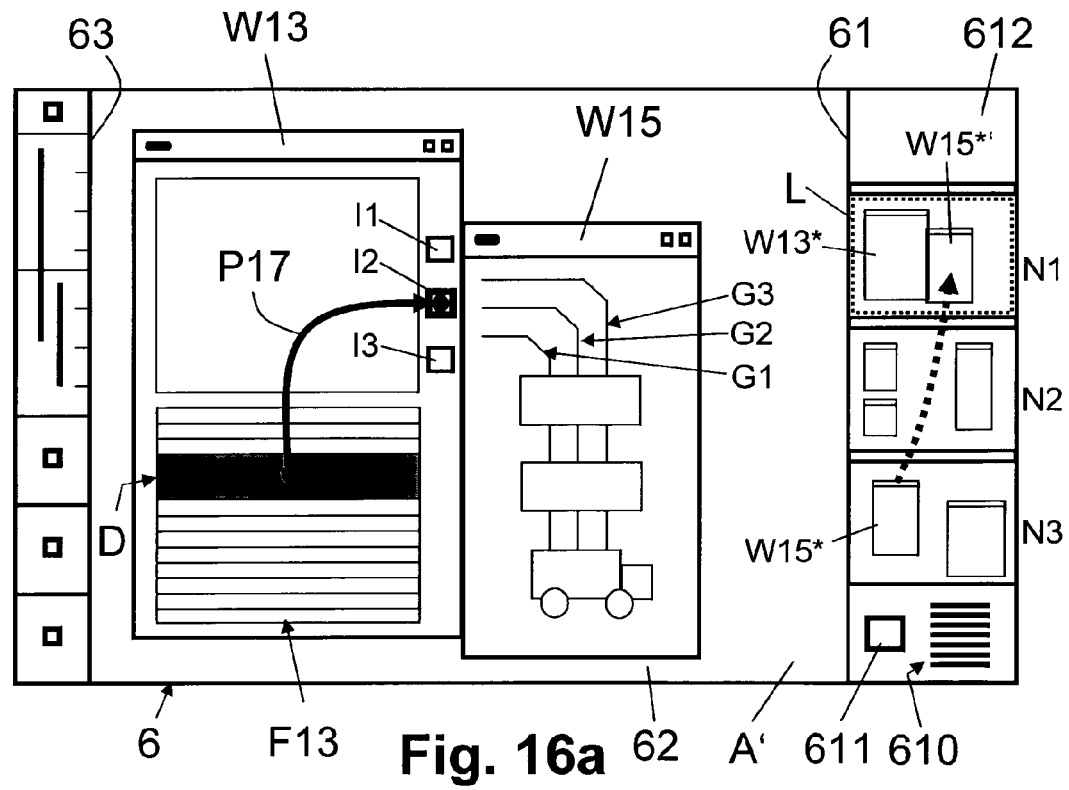
Figure 16B:
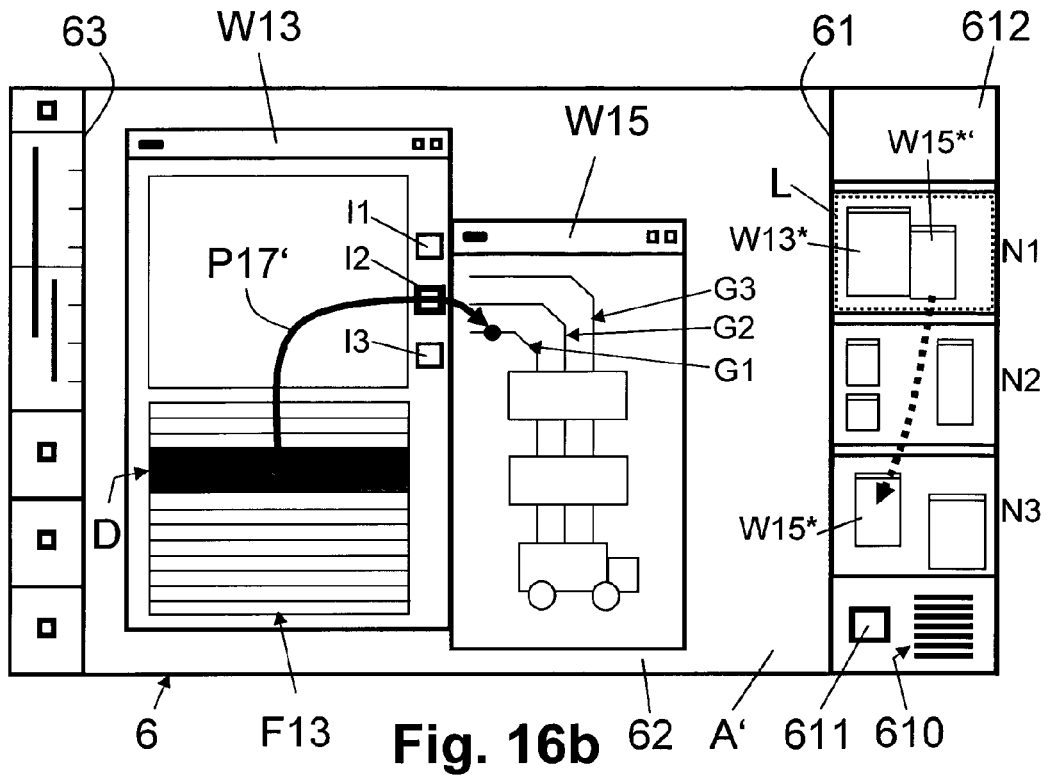
Figure 16C:
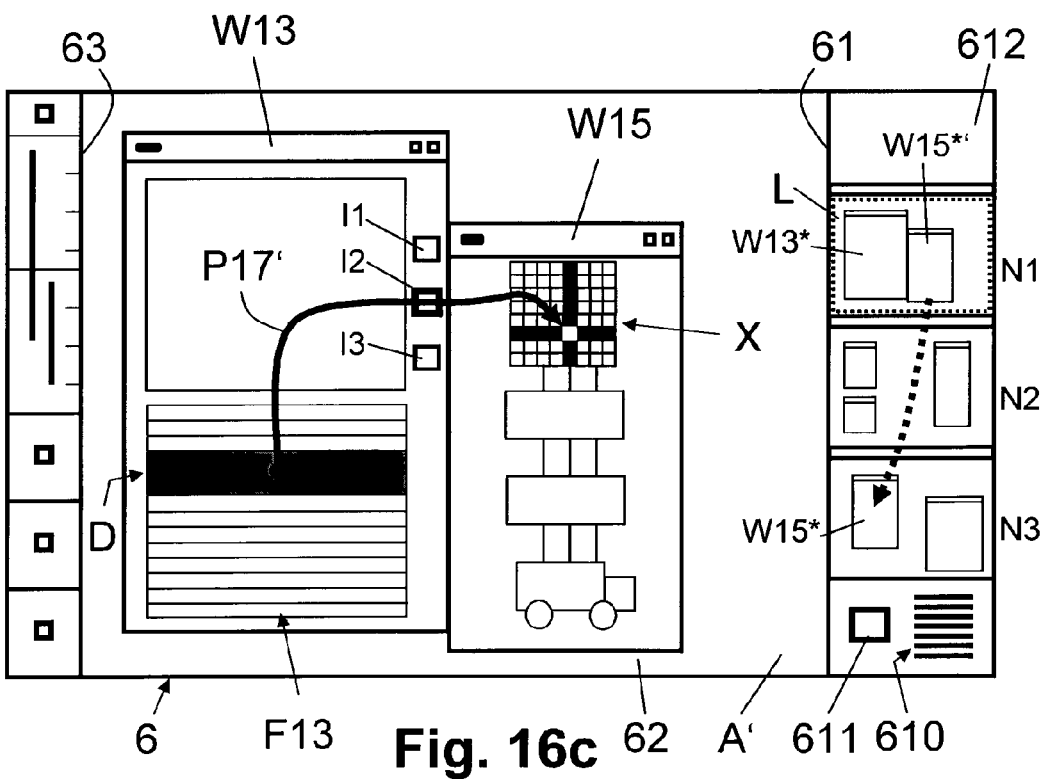

In FIGS. 16*a*-16*c*, further examples of the allocation of the content window F13 or of the data elements D selected therein to a particular processing action of a selected target widget W14 are illustrated. As shown in FIG. 16*a*, the target widget W15, which is determined by the user, as indicated by the arrow P17, by positioning the content window F13 or the data elements D selected therein, via the indicator 12, is joined or graphically docked to the source widget W13. If the target widget W15 is already active on the desktop A, as indicated by the miniaturized representation of the widget W15* in the navigation part-area N3 in the navigation area 61, it is displaced from its original position in the navigation part-area N3 into the navigation part-area N1, or at least temporarily indicated, as indicated by the dashed arrow in the navigation area 61, and represented there docked onto the miniaturized representation of the source widget W13* as target widget W**15*', shown miniaturized. As can be seen in FIGS. 16***a*-16*c*, the possible processing actions in the target widget 15 are shown graphically, for example as graphical symbols G1, G2, G3 or supply points to various production lines, production cases, conveyors, product delivery routes etc. If the user moves (drags) the content window F13 or the data elements D selected therein, as indicated by the arrow P17', to the graphical symbol G1 of the desired processing action and positions (drops) it there, the content window F13 or the data elements D selected therein are transferred to the target widget W15 for processing in accordance with the processing action determined by the relevant graphical symbol G1. As is shown diagrammatically in FIG. 16*b* by the dashed arrow in the navigation area 61, the miniaturized representation of the docked target widget W**15*', after completing transfer of the data elements to the target widget W15, is displaced back to the original position of the miniaturized target widget W15* or, respectively, the temporary representation of the docked target widget W15*' is terminated. If the selected target widget W15 was previously not active, it will now be removed from the widget inventory 610** of the inactive widgets.

In the example of FIG. 16*c*, the assignment and transfer of the content window F13 or the data elements D, selected therein, to the selectable processing action of the selected target widget W15 takes place not via the graphical symbols G1, G2, G3 but via a holding matrix X, indicated by the interface module 9, as has been described above in conjunction with figure 15*c*, wherein the relevant data elements, as indicated by arrow 17', are assigned to a particular cell of the holding matrix X by the user.

FIGS. 17*a*, 17*b* and 18*a*-18*d* illustrate examples of content windows or data windows, respectively, which are graphically displayable in the user interface 6 and are configured for indicating a data range variably adjustable by the user.

In the example of FIGS. 17*a* and 17*b*, the data range is adjustable by the user by choice of a particular scaling so that a differently large section of a scale of values 51 with correspondingly different resolution, different detailed content and/or different scale is shown in the content or data window 5, 5', respectively, in dependence on the scaling. The scaling is adjustable by the user by inputting a scaling parameter, for example by a graphical operating element such as a slider, a displaceable rider, a rotatable rotary wheel or via an input mask or, in a touch-sensitive display 60 by corresponding finger manipulations, e.g. by moving two fingertips positioned on the display 60 apart or together, respectively. In a preferred embodiment, the scalable content or data window 5,5' of FIG. 17*a*, 17*b* is configured as timing bar 631 for representing a number of graphically represented time intervals T1, T2, T3 in a scalable time window. The time intervals T1, T2, T3 represent, for example, planned and/or current productions of the production plant 1. As can be seen in FIGS. 17*a* and 17*b*, the current time T is indicated in the content or data window 5, 5', respectively, for example by a graphical symbol, a geometric element or a particular color marking. FIG. 17*a* shows the content or data window 5, respectively, with a high-resolution scaling in which the time domain between 5.45 h and 10.45 h is shown. In the resolution in the example of FIG. 17*a*, the time intervals T1, T2, T3 are not completely visible in the content or data window 5, respectively, for the user. FIG. 17*b* shows the content or data window 5, respectively, with a comparatively low-resolution scaling in which a greater time domain of between 3.45 h and 12:45 H is shown. The scaling in the example of FIG. 17*b* provides for a complete representation of the time intervals T1, T2, T3.

The reference symbols E1, E2 designate temporal events around 04:45 h or 07:00 h, respectively, for example disturbances, failures or interruptions of the production plant 1 which have occurred which are shown graphically precisely timed by the interface module 9 in time intervals T1, T2, T3. The reference symbols V1, V2 designate time delays around approx. 50 minutes or approx. 20 minutes, respectively, which, for example, are expected in the current production due to the events E1, E2 and which are shown or emphasized graphically in time intervals T1, T2, T3. The interface module 9 is configured in such a way that it indicates to the user, for example when clicking on or touching the time intervals T1, T2, T3, of the events E1, E2 and/or the expected time delays V1, V2, further detailed information in the user interface 6.

Figure 18A:
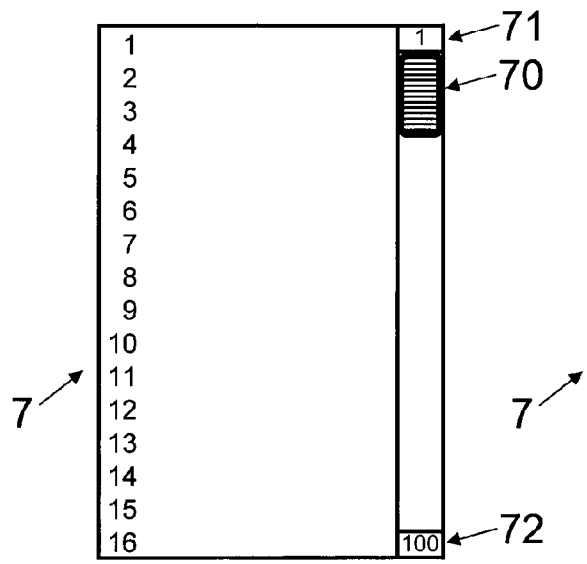
FIGS. 18a-18d: illustrate content windows with scrollable content area which is indicated, the area limits within which the content area is scrollable being variably adjustable via scrollable riders.
Figure 18B:
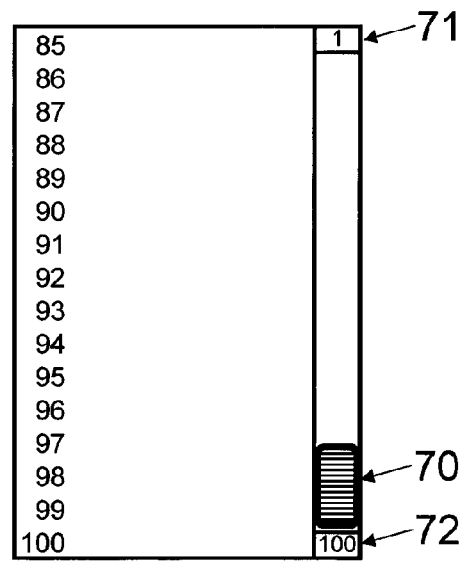
Figure 18C:
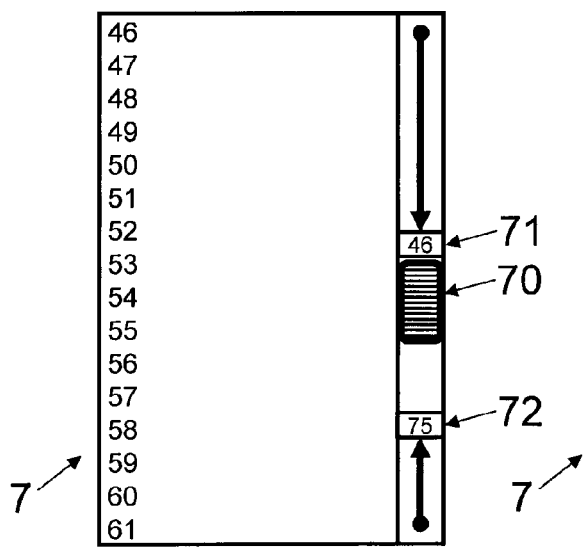
Figure 18D:
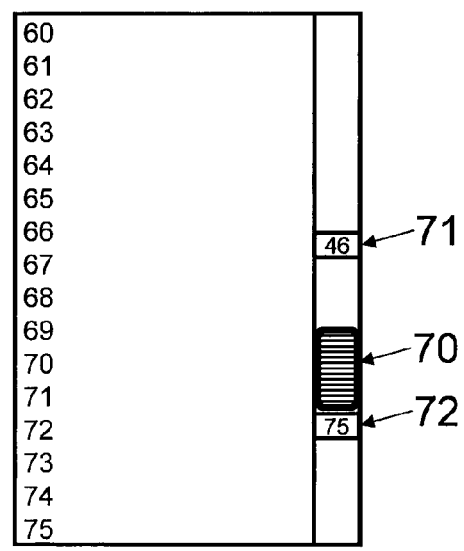

In the example of FIGS. 18*a*-18*d*, the content or data window 7, respectively, has a graphical element, especially a slider 70, for vertically displacing (scrolling) the coherent area of data lines to be indicated. In the example of FIG. 18*a*, the slider 70 is shown in the topmost position so that correspondingly, the data lines of a data array or of a data file, arranged topmost or at the beginning, respectively, are indicated to the user in the content or data window 7 which are marked by numbers 1 to 16 in the present example. In the example of FIG. 18*b*, the slider 70 is set in the bottommost position so that, correspondingly, the data lines of a data array or of a data file arranged bottommost or at the end, respectively, are indicated to the user in the content or data window 7, respectively, which are marked by numbers 85 to 100 in the present example. As is illustrated diagrammatically in FIGS. 18*a*-18*d*, the content or data window 7, respectively, is provided with indicated boundaries 71, 72 which determine the displaceable and displayable data area. In the example of FIGS. 18*a* and 18*b*, the boundaries 71, 72 are set to the maximum values of "1" or "100", respectively, so that the entire data area with all data lines 1-100 can be inspected in the content or data window 7 by corresponding adjustments of the slider 70. The user can adjust the displaceable and displayable data area by setting the boundaries 71, 72 so that a different area and a different number of data lines can be inspected and displaced (scrolled) in the content or data window 7 in dependence on the boundaries 71, 72. In the example of FIGS. 18*c* and 18*d*, the boundaries 71, 72 are set to the values "46" and "75", respectively, so that the data area with the data lines 46-75 can be inspected in the content or data window 7 by corresponding adjustments of the slider 70. In the example of FIG. 18c, the slider is set in the topmost position of the bounded area so that the user is correspondingly shown data lines 46-61 in the content or data window 7, respectively. In the example of FIG. 18d, the slider is set in the bottommost position of the bounded area so that the user is correspondingly shown the data lines 60-75 in the content or data window 7, respectively. As is illustrated in FIGS. 18c and 18d, the boundaries 71, can be adjusted and displayed, for example by displacing corresponding graphically represented riders or by inputting the boundaries in data input fields.

The expert will understand that the content or data windows 5, 5', 7 can be aligned not only vertically as shown in FIGS. 17a, 17b and 18a-18d but also horizontally.

In conclusion, it should be noted that, although a computer program code has been allocated to specific functional modules in the description and that the execution of steps has partially been described in a particular order, the expert will understand, however, that the computer program code can be differently structured and the order of at least certain steps can be changed without deviating from the subject matter of protection in doing so.

The invention claimed is:

1. A non-transitory computer-readable medium that stores executable instructions that direct a computer system to provide a graphical user interface, the graphical user interface comprising:
   a desktop; and
   a plurality of widgets arranged to be visible to the user on the desktop, said plurality of widgets comprising at least one source widget that comprises one or more content windows having data elements, wherein the plurality of widgets and the content windows are coupled in such a manner that a content window selected by the user and/or data elements selected therein are movable by the user from the at least one source widget, in which they are arranged, into at least one target widget visible to the user when the content window and/or the data element is selected, for the purpose of processing,
   wherein a first target widget of the at least one target widget is configured for creating a copy of a content window or of selected data elements respectively, which are positioned in the first target widget, and arranging the first target widget with the copy of the content window or the selected data elements, respectively, on the desktop.

2. The computer-readable medium of claim 1, wherein the widgets and the content windows are coupled in such a manner that a content window and/or data elements selected therein can be pulled out of the relevant source widget by the user without placement on the desktop, wherein the possible target widgets by which the relevant content window or the selected data elements, respectively, can be processed, are indicated to the user.

3. The computer-readable medium of claim 1, wherein the widgets and the content windows are coupled in such a manner that the target widgets are indicated stacked behind one another in the manner of roof tiles, wherein alternately in each case one of the target widgets is indicated foremost in the stack until the relevant content window or the selected data elements, respectively, are placed in the target widget currently indicated foremost, or again in the source widget.

4. The computer-readable medium of claim 1, comprising an information area for representing a section of the desktop and a much smaller navigation area in comparison with the information area, arranged outside the information area, with a miniaturized representation of the entire desktop and the widgets arranged thereon, wherein the navigation area and the information area are coupled in such a manner that a miniaturized representation of the target widget, into which the relevant content window or the selected data elements, respectively, have been placed, is marked for the user in the navigation area.

5. The computer-readable medium of claim 1, wherein the widgets in each case comprise one or more content windows and that the widgets and the content windows are coupled in such a manner that a content window is moved completely out of the relevant widget onto the desktop by the user, wherein the content window moved out of the widget in each case creates a new widget and the content window is arranged in the newly created widget.

6. The computer-readable medium of claim 1, wherein the widgets and/or content windows are each configured to be reduced in each case to a header bar by the user, wherein the header bar comprises a status indicator for indicating a current status value allocated to the relevant widget or content window, respectively.

7. The computer-readable medium of claim 1, wherein the widgets in each case comprise one or more visible indicators of other target widgets linked with the relevant widget, and that the widgets and the content windows are coupled in such a manner that a content window and/or data elements selected therein are each configured to be moved out of the source widget by the user via one of the indicators and wherein possible processing actions of the relevant target widget are shown to the user on which the content window or the selected data elements, respectively, is deposited for corresponding processing.

8. The computer-readable medium of claim 7, wherein the widgets and the visible indicators are coupled in such a manner that in the case of a movement of the content window or of the selected data elements, respectively, over one of the indicators, the target widget allocated to the indicator is indicated next to the source widget and that the possible processing actions are shown graphically in the relevant target widget.

9. The computer-readable medium of claim 7, wherein the user interface comprises a two-dimensional holding matrix representing the possible processing actions of the relevant target widget, and provides for a deposition of the content window or of the selected data elements, respectively, in a matrix cell for processing of the content window or the selected data elements, respectively, by a processing action determined by the relevant matrix cell.

10. The computer-readable medium of claim 1, wherein the widgets are coupled in such a manner that several widgets are configured to be tied to one another by stringing together on the desktop by the user in such a manner that they are configured to be moved as a unit on the desktop until they are separated again from one another by the user.

11. The computer-readable medium of claim 1, wherein the user interface comprises a widget inventory with a representation of available, but currently exclusively inactive widgets not arranged on the desktop, wherein the desktop and the widget inventory are coupled in such a manner that an active widget is movable from the desktop into the widget inventory by the user and during this process becomes inactive, and that an inactive widget is moved from the widget inventory onto the desktop by the user and during this process becomes active.

12. A computer-implemented method for generating a graphical user interface, the method comprising:
   generating a desktop and a plurality of widgets arranged to be visible to the user on the desktop, wherein said plurality of widgets comprising at least one source widget that comprises one or more content windows having data elements;

moving a content window based on movements of the source widgets;

moving the plurality of widgets based on movements of said at least one source widget;

arranging said plurality of widgets into at least one target widget visible to the user when the content window or the data element is selected, for the purpose of processing;

creating a copy of a content window or of selected data elements, respectively which are positioned in a first target widget of the at least one target widget; and arranging the first target widget with the copy of the content window or the selected data elements, respectively, on the desktop;

said method performed by a computing device under control of program instructions.

13. A computer program product comprising a non-transitory computer-readable medium with computer code, stored thereon, for controlling a processor in such a manner that the processor generates a graphical user interface, the computer code comprising:

an interface module configured to generate:

a desktop and a plurality of widgets arranged to be visible to a user on the desktop, wherein said plurality of widgets comprising at least one source widget that comprises one or more content windows having data elements, wherein said plurality of widgets and the content windows are coupled in such a manner that a content window selected by the user or data elements selected therein movable by the user from said at least one source widget, wherein said plurality of widgets are arranged, into at least one target widget visible to the user when the content window and/or the data element is selected, for the purpose of processing, wherein a first target widget of the at least one target widget is configured for creating a copy of a content window or of selected data elements, respectively, which are positioned in the first target widget, and arranging the first target widget with the copy of the content window or the selected data elements, respectively on the desktop.

14. A computerized device comprising:

a display; and a processor in communication with a computer readable medium storing software modules including instructions that are executable by the processor, the software modules including at least:

an interface module for generating a graphical user interface that comprises:

a desktop and a plurality of widgets arranged to be visible to the user on the desktop, wherein said plurality of widgets comprising at least one source widget that comprises one or more content windows having data elements, wherein said plurality of widgets and the content windows are coupled in such a manner that a content window selected by the user or data elements selected therein is moved by the user from a source widget, wherein said plurality of widgets are arranged, into at least one target widgets visible to the user when the content window and/or the data element is selected, for the purpose of processing; and wherein a first target widget of the at least one target widget is configured for creating a copy of a content window or of selected data elements, respectively, which are positioned in the first target widget, and arranging the first target widget with the copy of the content window or the selected data elements, respectively, on the desktop.

\* \* \* \* \*